(12) United States Patent
Yuen

(10) Patent No.: US 11,070,071 B2
(45) Date of Patent: Jul. 20, 2021

(54) POWER SUPPLY APPARATUS

(71) Applicant: Dayton Technologies Limited, Hong Kong (HK)

(72) Inventor: Paul Anthony Yuen, Hong Kong (HK)

(73) Assignee: Dayton Technologies Limited, Hong Kong (HK)

( * ) Notice: Subject to any disclaimer, the term of this patent is extended or adjusted under 35 U.S.C. 154(b) by 0 days.

(21) Appl. No.: 16/747,010

(22) Filed: Jan. 20, 2020

(65) Prior Publication Data

US 2020/0153260 A1 May 14, 2020

Related U.S. Application Data

(63) Continuation-in-part of application No. 15/838,402, filed on Dec. 12, 2017, now Pat. No. 10,564,607.

(30) Foreign Application Priority Data

Dec. 12, 2016 (HK) .................................. 16114123.3
Sep. 5, 2017 (HK) .................................. 17108957.5

(51) Int. Cl.
*H02J 7/00* (2006.01)
*G04G 17/08* (2006.01)
*G04G 17/06* (2006.01)

(52) U.S. Cl.
CPC ............ *H02J 7/0045* (2013.01); *G04G 17/06* (2013.01); *G04G 17/08* (2013.01); *H02J 7/0048* (2020.01)

(58) Field of Classification Search
CPC ...... H02J 7/0045; H02J 7/0048; H02J 7/0042; G04G 17/06; G04G 17/08; G04G 21/04; G04G 19/00; G04C 10/00; G04C 3/008
USPC ......................................................... 320/107
See application file for complete search history.

(56) References Cited

U.S. PATENT DOCUMENTS

| 6,217,339 B1 * | 4/2001 | Tsubata ................... G04C 10/00 439/38 |
| 2015/0255763 A1 * | 9/2015 | Lee ........................ H01M 50/20 320/128 |
| 2017/0261943 A1 * | 9/2017 | Kato ................... G04B 37/1486 |
| 2017/0357214 A1 * | 12/2017 | Choi ...................... G04G 17/04 |
| 2018/0287412 A1 * | 10/2018 | Patten ...................... G04G 9/00 |

* cited by examiner

Primary Examiner — Edwin A. Leon

(57) ABSTRACT

A battery charger for charging a portable electronic equipment, including a peripheral wall interconnecting a first base surface and a second base surface, an engagement portion protruding from the first base surface and extending in an axial direction to define an end surface a battery charging terminal protruding axially from the end surface, and a pair of self-engaging latches which is under a resilient bias to protrude laterally outwards and away from an engagement portion peripheral wall. The engagement portion has a lateral profile for insertion into a correspondingly battery charger receptacle along the axial direction. The latches are shaped dimensioned and positioned to retract inwardly towards the battery charging terminal upon encountering the battery charger receptacle until reaching a latching portion on the battery charger receptacle whereat the latches are to enter into releasable latched engagement with the latching portion.

20 Claims, 8 Drawing Sheets

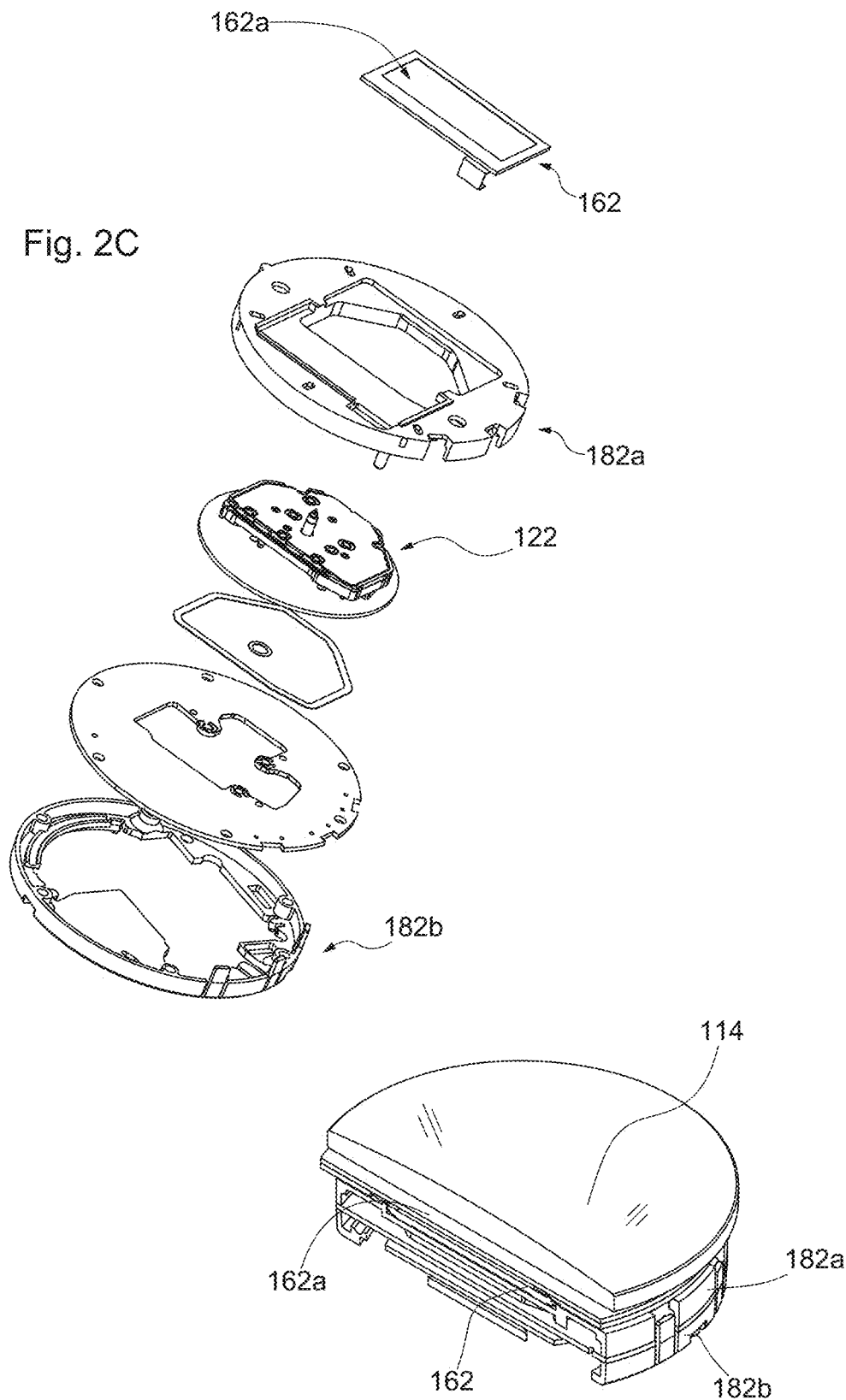

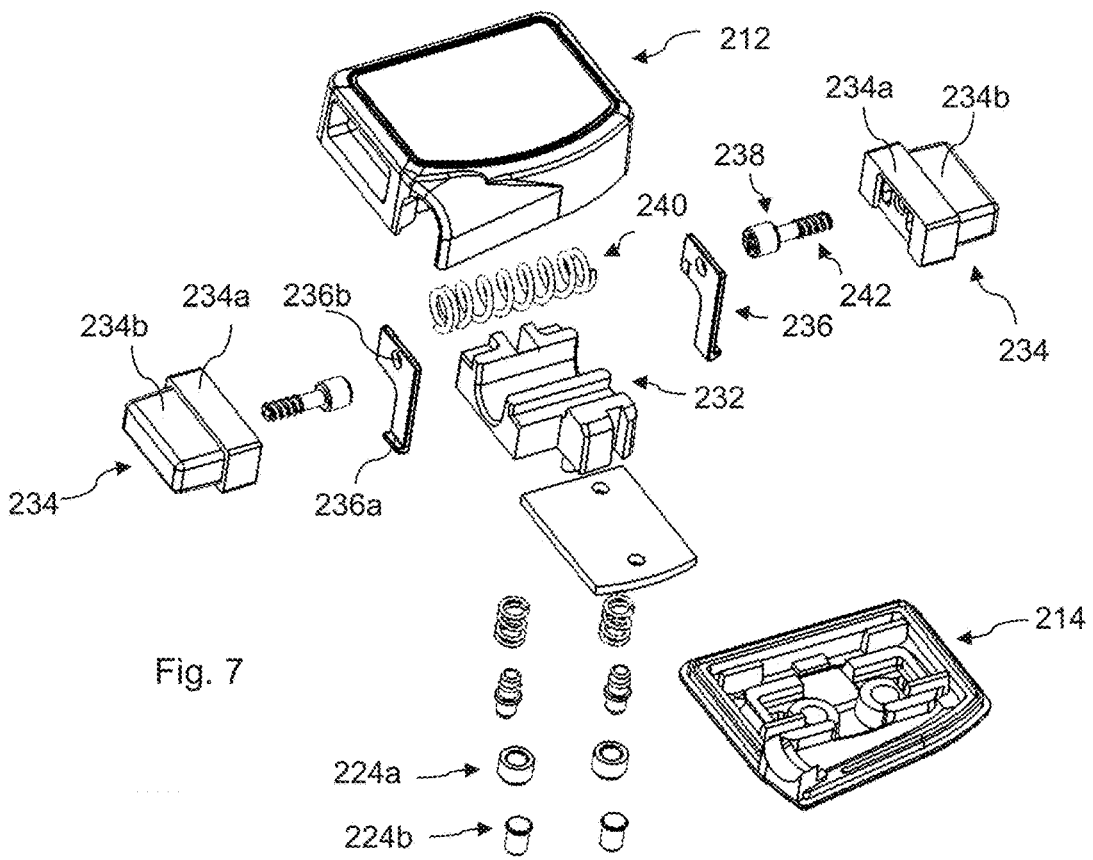
Fig. 7
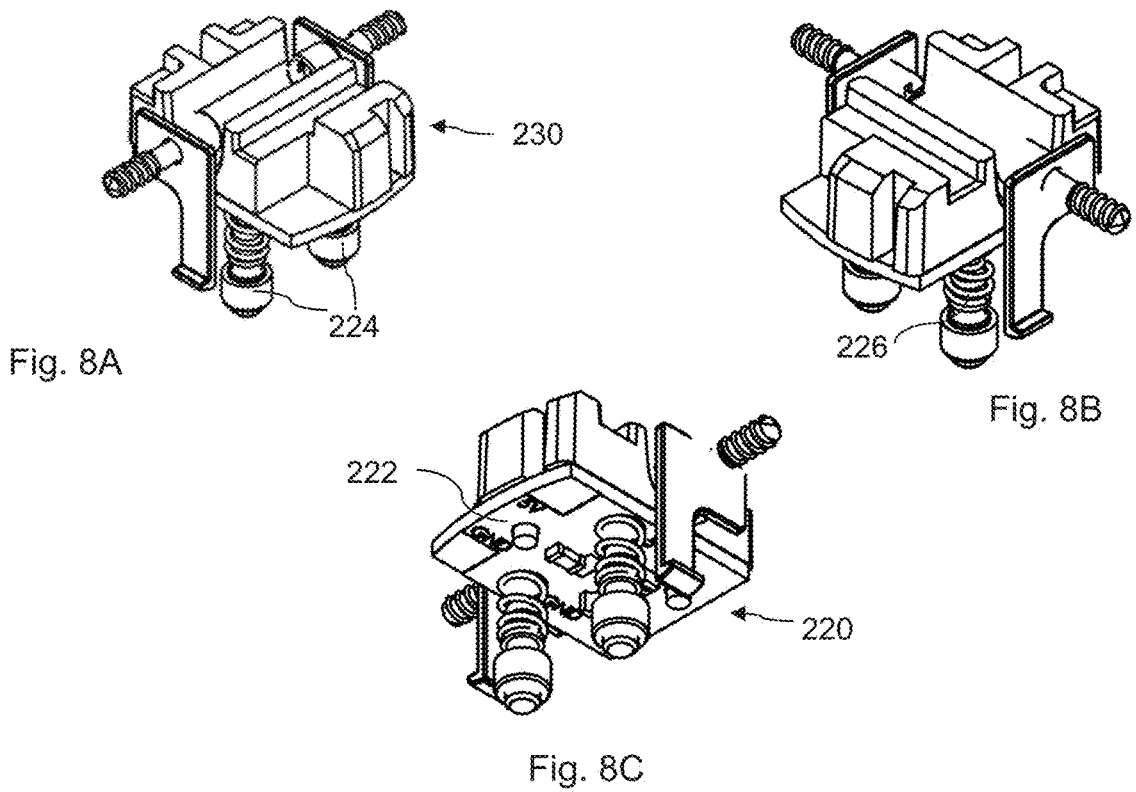
Fig. 8A
Fig. 8B
Fig. 8C

POWER SUPPLY APPARATUS

CROSS REFERENCE TO RELATED APPLICATIONS

This application is a continuation-in-part application of United States patent application U.S. Ser. No. 15/838,402, which was filed on Dec. 12, 2017 and claimed priority from Hong Kong Patent Application No. 16114123.3 filed on Dec. 12, 2016 and Hong Kong Patent Application No. 17108957.5 filed on Sep. 5, 2017. All the above are hereby incorporated by reference.

BACKGROUND OF THE INVENTION

Technical Field

The present disclosure relates to power supply apparatus such as a battery charger, and more particularly, relates to a miniaturized charger adapted for attaching to portable electronic equipment, such as a wrist watch or a mobile telephone.

Description of Prior Art

Many portable electronic apparatuses, such as a wrist watch or a mobile telephone, rely on rechargeable power sources. A common rechargeable power source is a rechargeable battery. In order to allow battery charging to be performed without removing the battery from the electronic apparatus, the electronic apparatus is equipped with a connector port to which a corresponding connector on the charger is connected. It would be desirable for the connector and the connector port to maintain good electric contact during battery charging.

BRIEF SUMMARY OF THE INVENTION

There is disclosed a battery charger comprising a plastic main housing, an internal compartment inside the main housing and extending between a first base surface and a second base surface, a main housing peripheral wall interconnecting the first base surface and the second base surface, a battery charging circuit inside the internal compartment, an engagement portion integrally formed with the main housing and protruding from the first base surface of the main housing and extending in an axial direction away from the internal compartment to define an end surface on an axial free end of the engagement portion distal from the first base surface, an engagement portion peripheral wall interconnecting the first base surface and the end surface, a pair of battery charging terminals or one battery charging terminal protruding axially from the end surface, a pair of self-engaging latches which is under a resilient bias of an internal spring arrangement to protrude laterally outwards and away from the engagement portion peripheral wall, and a pair of press buttons on opposite lateral sides of the main housing peripheral wall operable to retract the latches inwardly towards the pair of battery charging terminals and inwardly away from the engagement portion peripheral wall; wherein the protruding engagement portion has a lateral profile which is shaped and dimensioned for insertion into a correspondingly shaped and dimensioned battery charger receptacle along the axial direction, and the self-engaging latches are shaped dimensioned and positioned to retract inwardly towards the battery charging terminal upon encountering the battery charger receptacle until reaching a latching portion on the battery charger receptacle whereat the self-engaging latches are to move laterally outwards due to the resilient bias to enter into releasable latched engagement with the latching portion.

In some embodiments, the engagement portion has a tapered lateral profile for entering into closely-fitted releasable latched engagement with a corresponding shaped and dimensioned battery charger receptacle, and wherein the engagement portion tapers to narrow towards the end surface.

In some embodiments, the engagement portion has a curved lateral profile for entering into closely-fitted releasable latched engagement with a corresponding shaped and dimensioned battery charger receptacle.

In some embodiments, the main housing has a lateral extent and an axial extent, the lateral extent being measured in a direction orthogonal to the axial direction and defined between the lateral sides of the main housing peripheral wall, and the axial extent being defined between the first base surface and the second base surface; and wherein the lateral extent is substantially larger than the axial extent.

In some embodiments, the main housing has an axial extent of between 6 mm and 8.5 mm.

In some embodiments, the main housing has lateral extent of between 18 mm and 25 mm.

In some embodiments, the engagement portion is elongate and extends in a direction orthogonal to the axial direction to define a lateral direction, wherein the engagement portion has a lateral extent measured in the lateral direction and an axial extent defined between the end surface and the first base surface, and wherein the lateral extent is substantially larger than the axial extent.

In some embodiments, the engagement portion has an axial extent of between 2 mm and 2.5 mm.

In some embodiments, the engagement portion has a lateral extent of between 11 mm and 15 mm.

In some embodiments, the end surface has a surface area of between 0.35 cm$^2$ and 0.5 cm$^2$.

In some embodiments, the first base surface has a surface area of between 3 cm$^2$ and 4 cm$^2$.

In some embodiments, the end surface has a width of between 3 mm and 4 mm, the width being measured in a direction orthogonal with respect to the axial direction and orthogonal to a longitudinal axis of the engagement portion.

In some embodiments, the engagement portion has a volume of between 80 mm$^3$ and 100 mm$^3$.

In some embodiments, the main housing or the internal compartment has a volume of between 2 cm$^3$ and 3 cm$^3$.

In some embodiments, the battery charging terminal comprises an electrically conductive pin which is resilient biased to protrude form the end surface and which is retractable axially towards an interior compartment of the engagement portion.

In some embodiments, the main housing and the engagement portion are integrally molded of hard thermoplastics.

In some embodiments, the engagement portion is integrally formed as a plastic bead projecting axially from the first base surface.

According to the present invention, an apparatus comprising a battery-operated smart wrist watch and a battery charger according to the present invention in combination, wherein the watch comprises a watch casing and a bottom cover for sealing a bottom side of the watch casing, wherein the watch casing defines a viewing window and has a component receptacle inside which watch components are received and a battery compartment inside which a rechargeable battery is installed, wherein the bottom cover defines a battery charger receptacle which is formed as an indentation on the bottom cover and which comprises a base surface and a peripheral surface surrounding the base surface to define the indentation, and the battery charger receptacle comprises a latching portion for the pair of latches of the battery charger to anchor on; wherein at least one contact terminal or a plurality of contact terminals is formed on the base surface of the battery charger receptacle for communication with a battery charging terminal of the battery charger and the battery charger receptacle is shaped and dimensioned to match the shape and dimensions of the engagement portion of the battery charger so that the engagement portion are received and latched inside the battery charger receptacle by cooperation between the pair of latches of the battery charger and the latching portion when the engagement portion is inserted axially into the battery charger receptacle with the battery charging terminal in contact abutment with the contact terminal on the base surface of the battery charger receptacle.

In some embodiments, the bottom cover is a steel plate and the base surface is formed on a sealed plastic plate which is fastened to the bottom cover in a water-tight manner, and the contact terminal is formed on and extends through the plastic plate.

In some embodiments, the contact terminal is for data communication and/or for battery charging.

In some embodiments, the indentation of the battery charger receptacle has a depth of between 1.6 mm and 2.3 mm.

In some embodiments, the indentation of the battery charger receptacle has a lateral extent of between 11 mm and 15 mm.

In some embodiments, the base surface of the indentation of the battery charger receptacle has a surface area of between 0.35 $cm^2$ and 0.5 $cm^2$.

According to the present invention, a power supply apparatus or a charging apparatus comprising a main housing, power supply circuitry housed inside an internal compartment of the main housing, a contact electrode or a plurality of contact electrodes connected to the power supply circuitry and protruding from the main housing, and an attachment means; wherein the main housing comprises a first surface, a second surface and a lateral surface which extends between the first surface and the second surface to surround the internal compartment; wherein a protrusion portion is formed on the second surface and protrudes in an axial direction away from the second surface, the protrusion portion comprising a forward surface and a peripheral surface surrounding the forward surface; wherein the peripheral surface extends around the forward surface and interconnects the second surface and the forward surface, and defines an axial extent of the protrusion portion; wherein the contact electrode protrudes from the forward surface of the protrusion portion and extends outside the main housing; wherein the contact electrode is resiliently retractable towards the main housing and is movable along the axial direction and comprises an exposed electrical contact surface at an axial free end which is distal from the main housing; wherein the attachment means is for making releasable latched engagement with a target device to facilitate power transfer such that when the power supply apparatus is attached to a target device with the attachment means in releasable latched engagement with the target device, the exposed electrical contact surface at the axial free end is at a retracted state and is in compressive electrical contact with a contact surface of a charging port of the target device.

In some embodiments, the main housing comprises a first housing portion having the first surface and a second housing portion having the second surface which are joined together to define the internal compartment; wherein the second housing portion is molded of plastics and the protrusion portion is integrally formed on the second housing portion; and wherein the protrusion portions projects axially away from the second surface and the first surface and gradually tapers to narrow to form the forward surface.

In some embodiments, the protrusion portion gradually tapers to form a hollow integrally formed plastic shell on extending axially away from the first surface and the second surface.

In some embodiments, the contact electrode or the plurality of contact electrodes protrudes through an axial end of the plastic shell and extends axially.

In some embodiments, the attachment means comprises latching hooks which protrude through the peripheral surface of the protrusion portion and the latching hooks are movable in a lateral direction orthogonal to the axial direction between a latching state and a non-latching state.

In some embodiments, the latching hooks are operable by a pair of push buttons, the push buttons being aligned along a transversal axis and are moveable towards each other along the transversal axis under resilient bias to move the latching hooks into the non-latching state.

In some embodiments, the protrusion portion is non-symmetrical about the transversal axis.

In some embodiments, the protrusion portion is elongate, extends in a transversal direction which is orthogonal to the axial direction and defined between two parallel curves of substantially same curvature.

BRIEF DESCRIPTION OF FIGURES

The present disclosure and example embodiments are described by way of example with reference to the accompany drawings, in which:

FIG. 2C is an exploded view of the sub-assembly comprising the display module and mechanical movement assembly of the apparatus of FIG. 2B, FIG. 2D is a cut-away view along line X-X' of FIG. 2B of the apparatus, FIG. 7 is an exploded perspective view of the example battery charger 200 of FIG. 6A, FIGS. 8A, 8B and 8C are perspective views of the example battery charger 200 of FIG. 6A with the main housing 210, push buttons 234 and the helical spring 240 removed.

DETAILED DESCRIPTION OF THE INVENTION

Figure 1:
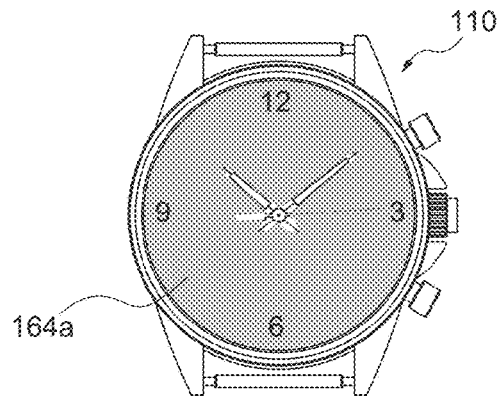
FIG. 1 is a plan view of an example apparatus according to the present disclosure with no electroluminescent message generated.
Figure 1A:
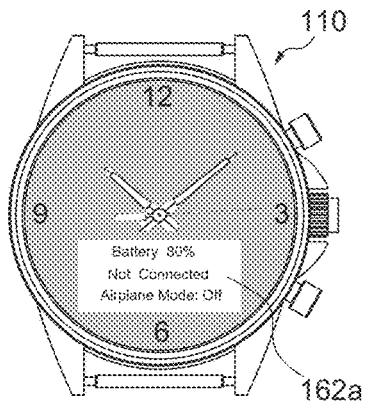
FIG. 1A is a plan view of the example apparatus of FIG. 1 when an electroluminescent message is generated.
Figure 2A:
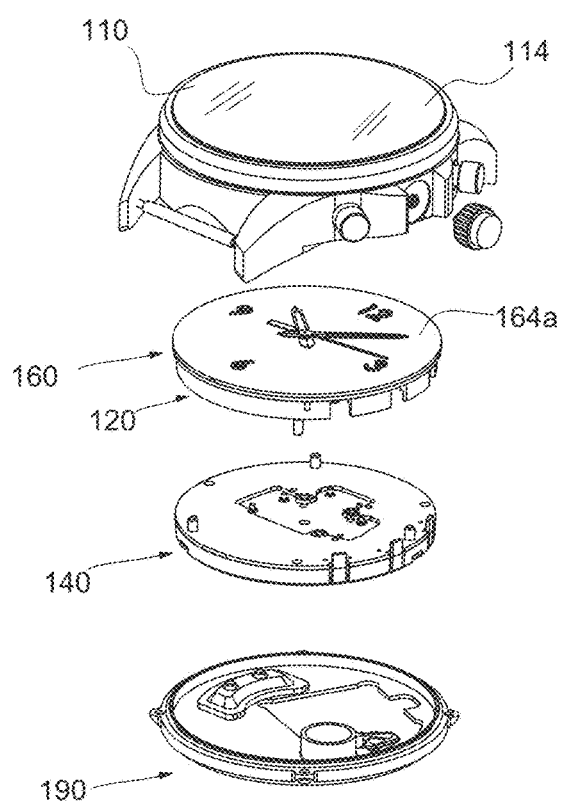
FIGS. 2A and 2B are exploded views of the example apparatus of FIG. 1.
Figure 2B:
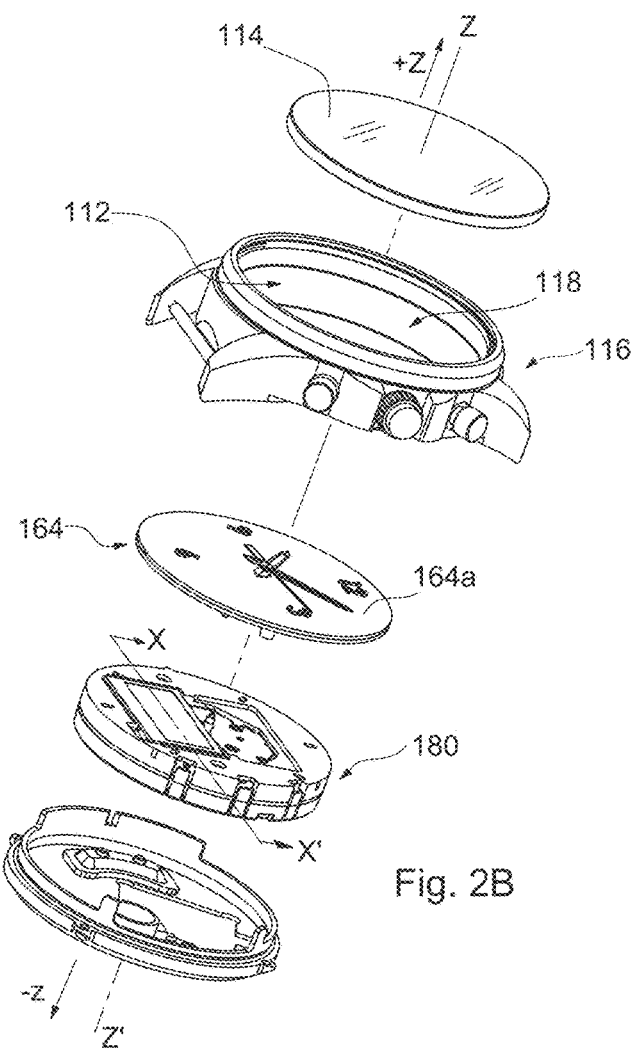
Figure 3A:
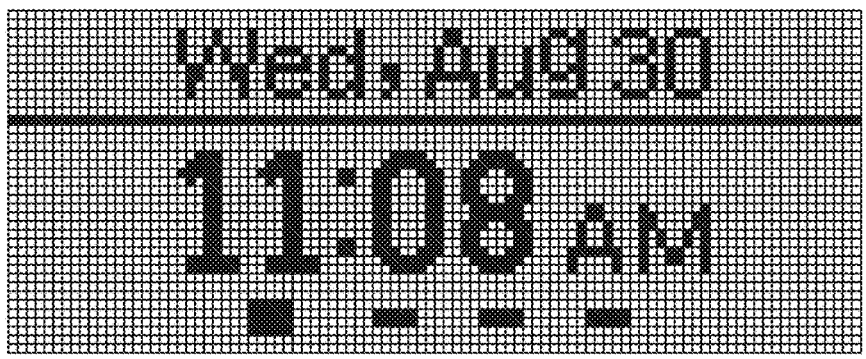
FIGS. 3A, 3B, 3C and 3D are example messages generated on the active display surface of the electroluminescent display device of the example apparatus of FIG. 1.
Figure 3B:
Figure 3C:
Figure 3D:
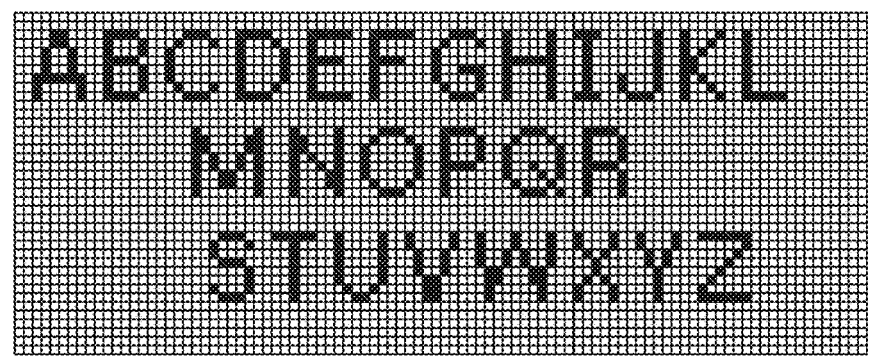

An example electronic display apparatus in an embodiment of a smart watch 100 comprises a main housing 110, a mechanical movement assembly 120, an electronic assembly 140, a display assembly 160, a component holding assembly 180 and a power source, as depicted in FIGS. 1, 1A, 2A, 2B, 2C and 2D.

The main housing 110 is a rigid body defining a main case having a main axis Z and an internal compartment 112. The main housing 110 includes a peripheral wall which extends axially between a top axial end and a bottom axial end to define the internal compartment 112. Various functional components, assemblies and sub-assemblies of the apparatus are accommodated inside the internal compartment 112. The top axial end of the main housing 110 defines a top entry aperture to the internal compartment 112 or a top aperture, and the bottom axial end of the main housing 110 defines a bottom entry aperture to the internal compartment 112 or a bottom aperture.

A viewing window 114 is mounted on the top axial end of the main housing 110 to close the entry aperture. The viewing window 114 is transparent and is made of a rigid and robust transparent material of high clarity, such as sapphire glass, mineral glass, acrylic crystal, polycarbonates, or other appropriate materials available for the time being. Optionally, the viewing window 114 is made of a scratch resistant transparent material to promote durability. The viewing window 114 is affixed or fastened to the main housing 110 by a bezel 116. The bezel 116 in this example is washer-shaped metal piece and defines a viewing aperture 118 of the apparatus. The sub-assembly comprising the bezel and the viewing window forms the outermost part of the apparatus in the axial direction, and is exposed to ambient conditions during normal uses. The viewing aperture 118 has a center axis which is usually co-axial with the Z-axis. This center axis defines a viewing aperture axis and a viewing axis.

In an embodiment, the main case is form of a single piece of metal, for example, steel, aluminum, aluminum alloy, aluminum steel alloy, or other metal or metal alloys for durability and weathering resistance. The rigid main case is known as a watch case where the apparatus is a watch, or smart watch, as a phone case where the apparatus is a smart phone, or known generally as a main housing in other apparatus.

A crown key connected to a stem and other control buttons for setting and/or operating the smart watch 100 are provided on the periphery wall of the main housing which defines the internal compartment 112. A button is also known as a push piece in the watch trade. A pair of strap holders comprising a first holder and a second holder is formed on the watch case. Optionally, the holders, which are known as lugs in trade, are integrally formed on the watch case. The first holder and the second holder are on opposite diametrical sides of the watch case and are for receiving a watch strap for securing the watch to the wrist of a wearer. The strap may be a bracelet strap, a leather strap, a plastic or rubber strap, a fabric strap or other straps available for applications.

The main housing further includes a back cover which is mounted to the bottom aperture of the main housing. The sub-assembly of the viewing window, the bezel and the back cover cooperate to define a water tight casing inside which the mechanical movement assembly 120, the electronic assembly 140, the display assembly 160, the component holding assembly 180 and the power source are retained.

The display assembly 160 comprises a display module 162, a dial member 164 and an optional back plate.

The display module 162 includes a luminous display surface 162a on which a luminous message or a plurality of luminous messages is to be formed, generated and displayed during normal operations. The message or messages to be formed or generated and displayed are time variant and are to change according to data received by the display module from time to time. The message or messages to be formed or generated and displayed are changeable, for example, changeable by user control or automatically by an embedded controller of the apparatus automatically at predetermined intervals, when triggered by events, or ad hoc. A user may change the message or messages to be formed or generated and displayed by interaction and dynamically when a user inputs instruction(s) through a user control interface, such as a control button or control buttons on the watch, for example, on the periphery of the watch case.

A message may comprise visual indicia, for example signs, symbols, icons, characters, alphabets, numerals, etc., which are formed as a pattern or a combination of patterns by selective activating a combination of display elements on the display surface of the display module from time to time. Visual indicia herein may comprise one icon or a plurality of icons, one symbol or a plurality of icons symbols, one alphabet or a plurality of alphabets, one numeral or a plurality of numerals, a character or a plurality of characters, and any combination of the aforesaid without loss of generality.

The display assembly 160 is held on the component holding assembly 180 with the display surface 1621 oriented to face outwardly, that is, to face the viewing window 114 and the viewing aperture 118. Optionally and typically, the display surface 162a is orthogonal to the axis of the viewing aperture, that is, faces outwards and orthogonally to the axis of the viewing aperture 118.

The dial member 164 is a translucent plate-like plastic member and includes a dial surface 164a, which is a viewable surface that is viewable by a user from outside the apparatus in a viewing direction which is generally in the −Z direction. A plurality of signs or symbols is fixedly or permanently marked or formed on the viewable dial surface 164a. The signs of symbols are time-invariant and are marked on the viewable surface by permanent fixation means such as printing, graduation, engraving, gluing, or other forms of fixed, permanent or time-invariant marking known to persons of ordinary skill in the art. In the example of a smart watch, the signs or symbols include signs representation time of the day. In some embodiments, for example, non-watch electronic apparatus, the time-invariant markings may form a background, a backdrop or a reference template, the dial member 164 would be referred to as a background member, a backdrop member, or a template member and its viewable surface would be referred respectively to as a background surface, a backdrop surface, and a template surface.

The dial member 164 is mounted on the main case with the dial surface 164a facing upwards or outwards towards the viewing aperture 118. The dial surface 164a is a main display surface or main information display surface of the apparatus 100 and is adapted for user viewing during normal use. The dial member 164 of the example smart watch has a dial axis which is parallel to or coaxial with the axis of the viewing aperture. A central aperture is formed through the dial member 164 to permit a driving axle of the mechanical movement assembly 120 to pass or extend through. The dial surface 164a has permanent reference or template markings according to applications. For example, the markings will represent orientations when the apparatus 100 is a compass and will represent prescribed locations when the apparatus 100 is a tracking device.

The mechanical movement assembly 120 comprises a driving module 122 and time-indicating arms to be driven by the driving module to indicate time. The example driving module 122 comprises an electro-mechanical movement assembly, which includes a powered driving device such as a miniature motor including a miniature stepper motor, and a gear train driven by the stepper motor and connected to an axle such as a cannon pinion for outputting movements, such as time-indicating movements, through a cannon pinion. Optionally, the driving module 122 comprises an oscillation circuit such as a quartz oscillation circuit for generating timing pulses. The time-indicating arms are mounted on the cannon pinion at different axial levels and comprises an hour-arm, a minute-arm and optionally a second-arm. An example driving module suitable for use as an analogue watch movement is the Hattrori Y121-E5 quartz analogue movement. The example Hattori movement has a thickness of less than 3 mm, a canon-pinion having a height of not exceeding 6.8 mm, a ligne size of 6.75×8 and a hand size of 110/65/20, as an indication of example dimensions. Optionally, the driving module is held with the axis of the cannon pinion parallel to the center axis of the dial surface, that is, orthogonal to the dial surface. The driving module is typically housed within a hard-plastic housing. The operation power of the example apparatus 100 is supplied by a battery, for example, a Lithium-ion rechargeable battery. In some embodiments, the mechanical movement assembly 120 is solely mechanical power driven, for example, powered by stored mechanical energy, including spring-stored energy.

The driving module 122 and the display module 162 are held and seated together on an example component holding assembly. The example component holding assembly 180 comprises a first holding member 182a, a second holding member 182b and a plurality of fasteners which is to tighten and fasten the first and second holder members 182a, b along an axial direction parallel to the axis of the cannon pinion. The first holding member 182a is a hard-plastic slab having an external peripheral boundary substantially following or conforming to the interior boundary of the watch case for reception therein, and with its major surfaces disposed orthogonal to the axis of the viewing aperture. The first holding member 182a defines a first receptacle for receiving the display module 162 and a second receptacle for receiving the driving module 122. The first receptacle is integrally formed as an indented seat so that the display module 162 is seated squarely on the indented seat with its bottom surface in abutment contact with the seat surface and its top surface flush with the top surface of the first holding member 182a. The first holding member 182a comprises a second receptacle for receiving the driving module 122. The second receptacle is a through aperture extending axially through the first holding member 182a. The through aperture of the second receptacle is defined by an interior peripheral boundary on the first holding member 182a and has an inner peripheral boundary matched with the outer periphery of the driving module so that the driving module is retained within the lateral boundary of the second receptacle and restrained from moving laterally in a direction orthogonal to the axis of the dial surface. Threaded fasteners such as screws or unthreaded fasteners such as snap fasteners may be used for fastening the first and second holder members 182a, 182b where appropriate.

In some embodiments such as the present, both the first and second holder members 182a, 182b is in black and formed of a thermoplastic of sufficient strength and rigidity, such as ABS (acrylonitrile butadiene styrene). In some embodiments, at least one of the first and second holder members 182a, 182b is formed of a black and hard thermoplastic so that at least a major surface bearing the first receptacle which faces the viewing window of the apparatus is in black and the first receptacle is in black. In general, the component holding assembly 180 or at least the first holder member 182a is formed in a dark color for enhanced concealment of components underneath the dial member.

The example component holding assembly 180 sets a very dark background underneath the dial member and delimits a window through which the active display area of the display module 162 is exposed and viewable from outside the apparatus. As time variant information, such as messages, patterns, figures, signs, symbols, or their combination, is to be displayed on the active area of the display module 162, the window delimited by the component holding assembly 180 for exposing the active area of the display module is an information display window. The window is shaped to match the lateral shape of the display module 162 and has an interior boundary which follows the outer lateral boundary of the display module 162 for close fit. In some embodiments, a large active display area is required and the active display area of the display module may have the same or comparable dimensions as the dial surface or the viewing aperture.

In such embodiments, the entire or a substantial portion of the outward facing surface of the display module would constitute the information display window.

As the component holding assembly 180 is in black and the casing of the mechanical movement assembly 120 is also in black, the components which are underneath the dial member is well concealed when the apparatus is exposed under illuminated indoor conditions or under diffused sunlit outdoor conditions.

The electronic assembly 140 comprises a printed circuit board on which a digital assembly, a display driver, optional wired or wireless communication frontend(s), and peripheral functional circuits such as user control interface and charging circuits are mounted, preferably surface mounted. The electronic assembly 140 is connected to a battery as a power source to obtain operation power and is connected to the display module 162 to output data to the display module for display and to supply electrical power for driving the display module 162.

Figure 5:
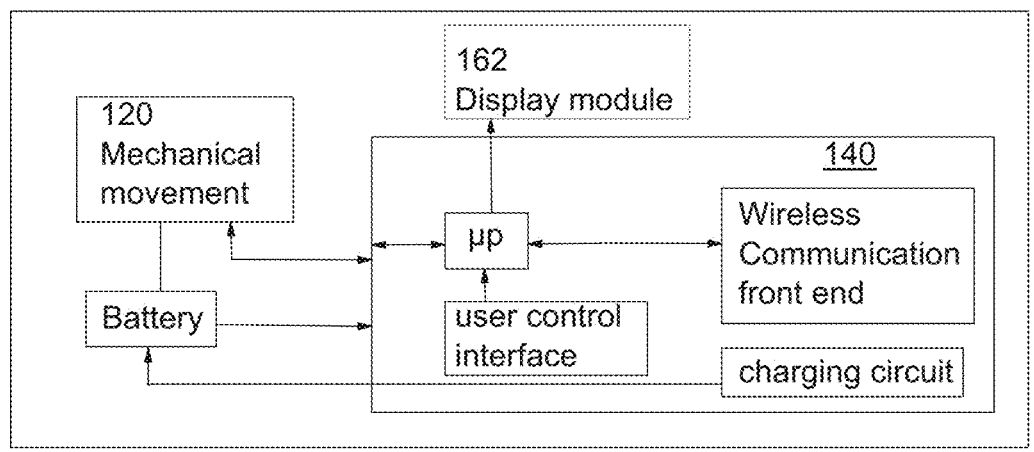
FIG. 5 is an example schematic diagram showing an electronic circuit of the example apparatus of FIG. 1, FIGS. 6A and 6B are perspective views of an example battery charger 200 according to the present disclosure.

The digital assembly comprises a microprocessor (μP or a microcontroller) and peripheral circuits, as depicted in FIG. 5. An example digital assembly suitable for use is a device identified by product number nRF51822 of Nordic Semiconductor ASA of Norway. The nRF51822 is multi-protocol SoC suited for Bluetooth® low energy and 2.4 GHz ultra low-power wireless applications. The nRF51822 is built around a 32-bit ARM® Cortex™ M0 CPU with 256 kB/128 kB flash+32 kB/16 kB RAM for improved application performance. The embedded 2.4 GHz transceiver supports Bluetooth low energy protocol stack. The peripheral circuits may comprise wireless communication front ends to facilitate data and/or voice communications with a paired device.

An example wireless frontend comprises a wireless transceiver adapted to communicate using Bluetooth protocol, for example, BLE (Bluetooth low energy protocol). The wireless transceiver is connected to the microcontroller so that data instructions commands or messages from an external data source can be transmitted to the microcontroller for processing by the microcontroller upon execution of stored instructions, for example, instructions stored on a memory device on the digital assembly. The wireless transceiver is connected to the microcontroller so that data instructions commands or messages originating from the watch can be transmitted out of the watch to an external data processing device upon instruction of a user or the microcontroller. For example, electronic messages originated from an external data equipment, for example, a smart phone or tablet computer, can be retrieved and read by a user when displayed on the display. Alternatively, a message, for example, a voice message or command message, can be sent from the watch to an outside or an external data equipment through operation of command buttons on the watch in cooperation with the microcontroller. An antenna to facilitate external data communication is mounted on an underside of the support substrate, or more specifically on an underside of the printed circuit board.

An example display module 162 comprises display panel which is mounted on a printed circuit board and a module casing and has a connector for receiving data for display and operation power. The display panel has an active display surface 162a defining an active display area. Electro-luminescent display elements are scattered or distributed on the active display area. An electro-luminescent display element herein means one which is to become luminous when activated by an activating electrical power or current. A display module comprising an LED (Light Emitting Diode) display panel, an OLED (Organic Light Emitting Diode) display panel or a back-lit LCD (Liquid Crystal Display) display panel may be used. An OLED display device is selected for its relatively high resolution, its relatively high luminosity and compactness.

Each display element of the display module is an electro-luminescent display element, referred to as an electro-luminescent pixel (or a "pixel" in short for succinctness herein) and the plurality of pixels defined by the plurality of electro-luminescent display elements on the active display area can be selectively activated to form a pattern. Each pattern may be formed to correspond to a human readable or perceivable message and a plurality of different human readable or perceivable messages can be generated, for example, by activation of selected pixels at selected different locations or combination of different locations without loss of generality.

In order to have a display panel surface that is capable of generating a pattern having a relative high resolution so that more information or data with fines details can be accommodated within a relatively small area, an integrated circuit type display panel is preferred. However, a display panel constructed from discrete electro-luminescent display elements can also be used without loss of generality.

The electro-luminescent pixels of a display panel are usually arranged or distributed in a matrix comprising a plurality of rows of pixels and a plurality of columns of pixels. For a typical LED, OLED or LCD display panel of a relatively high resolution, the electro-luminescent pixels are arranged into a regular matrix in which the spacing between adjacent pixels in a row is a first constant or uniform, spacing between pixels in a column is a second constant or uniform, and/or the first constant and the second constant is the same such that the spacing between adjacent pixels in a row is equal to the spacing between adjacent pixels in a column. Preferably, the pixels are of the same shape and dimensions for enhanced uniformity, although the pixels may have different shapes and/or dimensions adapted for specific applications. In some specific applications, the spacing between adjacent pixels in a row may be non-uniform, the spacing between pixels in a column may be non-uniform.

An example OLED display module which is suitable for forming a visible pattern having a relatively high resolution within a relatively small active area is product no. ELW0801AC of Futaba Corporation, Japan. The ELW0801AC OLED panel is a digital display having an active area of 18.02 mm×7.30 mm (131.546 mm$^2$), with 96 pixels distributed in a row (X-direction) having a spacing of 0.03 mm between adjacent pixels in the row and 39 pixels distributed on a column (Y-direction) having a spacing of 0.03 mm between adjacent pixels in a column. Each pixel of the OLED panel is substantially square and has a uniform pixel size of 0.158 mm in the X-direction and 0.156 mm in the Y-direction, and a uniform pixel pitch of 0.188 mm in both the X- and Y-directions. As there are a total of 3744 pixels within the active area, there are in average 28.46 pixels per square mm. This pixel density transpires into 135.3 pixels per inch (PPI) in the Y-direction and 135.7 pixels per inch (PPI) in the X-direction. A display panel having a relatively high resolution for the present applications would be one having between 101 PPI to 150 PPI, for example, having 101 PPI or more, 120 PPI or more or less, 121 PPI or more or less, 130 PPI or more or less, 131 PPI or more or less, 140 PPI or more or less, 141 PPI or more or less, 150 PPI or more or less, 151 PPI or more or less, 160 PPI or more or less, 161 PPI or more or less, 170 PPI or more or less, 171 PPI or more or less, 180 PPI or more or less, 181 PPI or more or less, 190 PPI or more or less, 191 PPI or more or less, 200 PPI or less, or any range or ranges formed by selective combination of the aforesaid values.

Each pixel of the example OLED panel is a self-luminous pixel which is to emit light when activated. The example OLED panel is to generate a white light having a luminance of between 240 cd per square meter and 360 cd per square meter when all pixels are activated, with the typical or average luminance of 300 cd per square meter.

Examples patterns and messages or information constructed from different spatial combinations of pixels representing example alphabets, icons signs and symbols and example messages that can be displayed in the example active display area of the example display device are depicted in FIGS. 3A to 3D. Non-exhaustive example pixel matrix sizes required to form example elements for information display are set out below:

| | | | |
|---|---|---|---|
| 6 × 5 | a, c, e, o, n, x | 9 × 6 | w |
| 8 × 5 | d, b, g, h. p, q, y<br>B, E, J, K, L, P, R | 10 × 3 | {,} |
| 7 × 4 | t | 7 × 3 | ~ |
| 8 × 4 | f, k | 8 × 6 | £, A, C, D, F, G, H, N |
| 10 × 2 | j | 3 × 3 | ° |
| 8 × 1 | i, l | 8 × 10 | ¼, ½, ¾ |
| 7 × 6 | m, ± | 14 × 12 | ° F., ° C. |
| 6 × 4 | r, s, u, v, z | 8 × 3 | I |
| 8 × 8 | M | 8 × 7 | O, Q |

The watch dial 164 comprises a dial member having a dial surface or a viewable surface which is outward facing, that is, facing the viewing aperture or the +Z-direction. A typical dial surface of a watch has a diameter of between 28 mm-36 mm. Generally, a large dial surface has a typical diameter of 36 mm, a medium dial surface has a typical diameter of between 30 mm-32 mm, and a small dial surface has a typical diameter of between 28 mm-30 mm.

The dial member 164 is formed from a low haze translucent plastic slab. A low haze plastic slab facilitates good or easier readability of a pattern or patterns having a small size when the pattern or patterns appear on the dial surface.

An example low haze translucent plastic slab is formed from a low haze clear plastic material which is homogeneously doped with pigments to make a clear plastic slab translucent. Poly-methyl methacrylate (PMMA), also known as acrylic or acrylic glass, and polycarbonates (PC) are examples of clear plastic materials having a low haze. Another example low haze translucent plastic slab is formed by deposition of pigments on one or both major surfaces of a clear base plastic slab having low haze.

A translucent dial member is selected so that what is below or underneath the dial member, in the −Z direction, is not visible to the naked human eyes when viewed at a normal viewing distance along the viewing axis during normal use of the apparatus, whether under indoor illuminated or outdoor sunlight conditions.

A smart watch having an analogue mechanical movement with moving time-indicating arms (hour-arm, minute-arm, and/or second-arm) such as that of FIG. 1 would appear only as a conventional analogue watch with a permanently marked dial surface and with the time-indicating arms moving. When the smart watch is required to perform functions of a conventional analogue watch, that is, to indicate time according to instantaneous spatial positions of the time indicating arms with reference to the time-indicating markings on the dial member functions, the display module and other components underneath the dial member is visually concealed, when under indoor illuminated conditions or under outdoor diffused sunlit conditions. A visible information bearing message will only appear on the dial surface when a message is generated by the embedded controller. Non-visibility of the underlying display surface or other components underneath the dial member when no message is being displayed is vital to maintain integrity of dial surface design, since otherwise design of the dial surface is always subject to the constraint of having to incorporate an unsightly visible information display window revealing an unsightly display surface of the display module even when there is no information being instantaneously displayed on the information display window.

So that a message being displayed on the active display area of the display module is viewable by the naked eyes of a viewer at a normal viewing distance and angle through a translucent dial member while the active display area of the display module is to remained concealed, invisible or non-viewable to the naked eyes when viewed at the normal viewing distance and the normal viewing angle under indoor illuminated conditions or under diffused sunlit ambient conditions requires a technical scheme of solutions.

To meet such requirements, a translucent filter in the form of a dial member in the example case of a watch is disposed between the viewing window 114 and the active display area of the display module 162. The normal viewing distance in the case of a watch is usually taken as between 12 cm and 35 cm, depending on the habit and eye-sight wellness of a viewer.

During a first mode of operation when the smart watch is to appear visually as a conventional analogue watch only, the time-indicating arms above the dial surface 164a and the reference time-indicating markings on the dial surface are readable or viewable due to reflection of ambient illuminations by the time-indicating arms, the dial surface and the markings on the dial surface. To facilitate concealment of the active display area and the information display window delimiting the active display area which are underneath the translucent filter, the viewing window and the translucent filter in combination would need to attenuate the ambient illuminations impinging on the outward facing surface of the translucent filter by an adequate amount, so that what is underneath the translucent filter is not viewably exposed to the naked human eyes. The ambient illuminations herein may be due to indoor illuminations or diffused sunlight and the term "ambient illuminations" is also referred to as "ambient light" where appropriate.

During a second mode of operation when the smart watch is to generate a luminous message for user viewing, the message must have a sufficient brightness to be viewable by the naked eyes at a normal viewing distance. A sufficient brightness would be one that is over and above the brightness of the ambient illuminations.

As the luminous message would need to travel or traverse through both the viewing window and the translucent filter in order to exit from the watch and reach the naked eyes of a viewer, the combined attenuation due to the viewing window and the translucent filter must not be too high to make the luminous message too dim to be readable. In other words, the combined attenuation due to the viewing window and the translucent filter must below a threshold attenuation so that the residual luminosity of the luminous message is still sufficient to facilitate reading and viewing by the naked eyes of a viewer under illuminated conditions. To facilitate reading and viewing of the luminous message by the naked eyes of a viewer when the message appears on the marked dial surface 164a under illuminated conditions, the residual luminosity of the luminous message must have a sufficient brightness that is over and above a threshold brightness which is the brightness of the ambient illuminations.

The disposition of a translucent filter having a predetermined light attenuation level range between the active display area and the viewing window has provided a useful solution to the conflicting technical requirements of the first and second modes.

Figure 4:
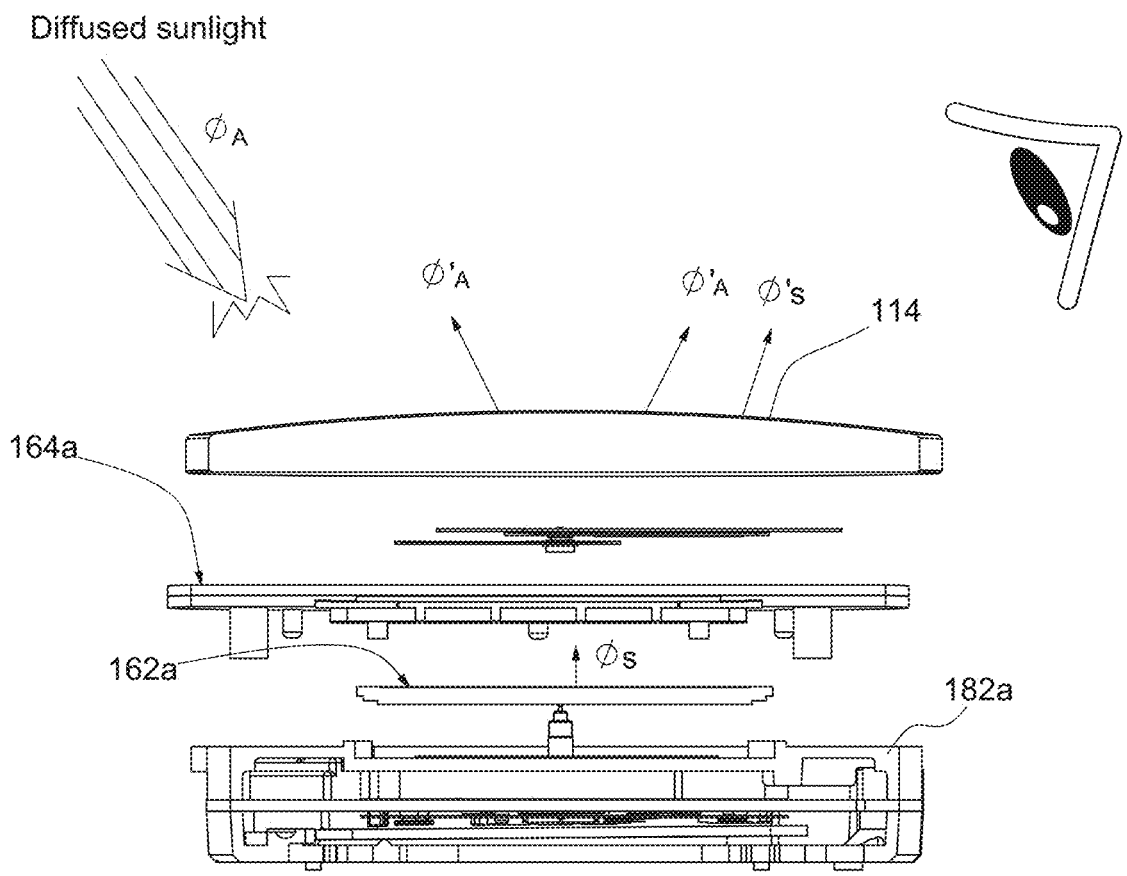
FIG. 4 is a schematic diagram depicting example viewing of the dial surface under ambient illuminated conditions.

Referring to FIG. 4, incoming ambient light having a luminous level $\varnothing_A$ at the outside surface of the viewing window 114 will have a residual luminosity having a luminous level $\varnothing_r$ on reaching the active display surface 162a of the display module, due to a first attenuation and a first partial reflection by the viewing window 114 and due to a second attenuation and a second partial reflection by the dial member 164, which comprises a translucent filter in this example. The incoming ambient light after combined attenuation and partial reflection by both the viewing window and the translucent filter member will reach the active display surface 162a and a portion of the attenuated incoming ambient light at the luminous level $\varnothing_r$ will be reflected by the active display surface 162a and moves towards the viewing window to exit. The reflected incoming ambient light will be attenuated again by the translucent filter member which is the dial member 164 in this example and the viewing window before reaching the outside surface of the viewing window.

The incoming ambient light which appears at the outside surface of the viewing window after reflection by the active display surface 162a when in the first operation mode can be expressed as: $\varnothing'_A=(\varnothing_A-\Delta_{attn})\times R-\Delta_{attn})$, where $\varnothing_A$ is the luminous level of the incoming ambient light on reaching the viewing window, $\Delta_{attn}$ is the combined attenuation and reflection of light due to the viewing window and the translucent window, and R is the effective reflectivity of the active display surface of the 162a of the display module, and $\varnothing_r=(\varnothing_A-\Delta_{attn})$.

When in the second operation mode, which is a data display mode or a message display mode, the light emitted by the electroluminescent display or the luminous elements of the electroluminescent display having a luminosity level $\varnothing_s$ will be attenuated by the combined attenuation due to the viewing window and the translucent window and the resulting luminosity at the at the outside surface of the viewing window when in the second operation mode can be expressed as: $\varnothing'_s=(\varnothing_s-\Delta_{attn})$.

In order that a luminous pixel or message is viewable or readable by a viewer viewing from outside of the watch at an acceptable viewing angle while under ambient illuminated conditions, the luminosity $O'_s$ of the luminous pixel or message at the outside surface of the viewing window must be at or above a first luminous threshold level $\varnothing'_{th1}$, that is, $\varnothing'_s \geq \varnothing'_{th1}$, where $\varnothing'_{th1}$ is a minimum visibility brightness threshold level. At the same time, the luminosity $\varnothing_s$ at the display screen of the display module, which results in a luminosity level $\varnothing'_s$ at the outside surface of the viewing window, should be below a threshold brightness value $\varnothing_b$ at which the luminous pixel or message will become blurred due to over-brightness. This threshold brightness value $\varnothing_b$ corresponds to a threshold brightness value $\varnothing'_b$ at the outside surface of the viewing window. Therefore, it is preferred that the luminosity level $\varnothing_s$ at the display screen of the display module is at or below $\varnothing_b$ for good displayed message clarity, where $\varnothing_b$ is a blurring luminance threshold and $\varnothing_{th1}$ is a minimum visibility brightness threshold level at the display screen of the display module corresponding to the minimum visibility brightness threshold level at the outside surface of the viewing window. Where the blurring threshold $\varnothing_b$ is equal to or larger than the visibility threshold $\varnothing_{th1}$, the value of $\varnothing_s$ can be a value between $\varnothing_{th1}$ and $\varnothing_b$, that is $\varnothing_{th1} \leq \varnothing_s \leq \varnothing_b$. However, where the value of $\varnothing_b$ at the display screen of the display module is lower than the readability threshold value of $\varnothing_{th1}$, that is, the value of $\varnothing'_b$ at the outside surface of the viewing window is lower than the value of $\varnothing'_{th1}$, the luminosity level $\varnothing_s$ at the display screen of the display module may be selected at a level which is between $\varnothing_b$ and $\varnothing_{th1}$ as a convenient balance or compromise, where $\varnothing'_b$ is a blurring luminance threshold at the outside surface of the viewing window. Therefore, a preferred display module to be selected for the present application should meet the criteria $\varnothing_{th1} \leq \varnothing_s \leq \varnothing_b$ at the display screen of the display module, or the criteria $\varnothing'_{th1} \leq \varnothing'_s \leq \varnothing'_b$ at the outside surface of the viewing window, while a workable display module would meet $\varnothing_b \leq \varnothing_s \leq \varnothing_{th1}$ or the corresponding relationship $\varnothing'_b \leq \varnothing'_s \leq \varnothing'_{th1}$ at the outside surface of the viewing window.

In order that the active display surface 162a is concealed under ambient illuminated conditions when operating in the first operation mode, that is, an analog watch-only operation mode in this example, the luminosity $\varnothing'_A$ of the residual ambient light after reflection by the active display surface 162a and on appearing on exit at the outside surface of the viewing member should be below a second luminous threshold level, i.e. $\varnothing'_A < \varnothing_{th2}$. This second luminous threshold level $\varnothing_{th2}$ is a threshold of visibility $Th_v$ above which the display screen of the display module becomes visible under ambient illuminated conditions due to $\varnothing_A$. When under outdoor sunlight ambient conditions, $\varnothing_A=\varnothing_{A\_sunlight}$ and the threshold of visibility $Th_v$ under sunlight ambient conditions is $Th_{v\_sunlight}$.

To meet the second luminous threshold level, $\varnothing'_A < \varnothing_{th2}$, that is, $\varnothing'_A < Th_v$. When under sunlit illuminated ambient conditions, the relationship becomes: $\varnothing'_A < Th_{v\_sunlight}$.

To facilitate effective concealment of what is underneath the dial member, the translucent dial member would preferably have an attenuation $\&_{tan}$ meeting the requirements below:

$$\varnothing'_s=(\varnothing_s-\Delta_{attn}) \geq \varnothing'_{th1}, \text{ and}$$

$$\varnothing'_A=(\varnothing_A-\Delta_{attn})\times R-\Delta_{attn}) < Th_v \text{ or } Th_{v\_sunlight} \text{ when}$$
$$\varnothing_A=\varnothing_{A\_sunlight}.$$

In general, the translucent dial member would have an attenuation $\Delta_{attn}$ between a first attenuation threshold $\Delta_{th1}$ and a second attenuation threshold $\Delta_{th2}$.

The luminosity $\phi'_s$ of the luminous pixel or message at the outside surface of the viewing member is related to the luminance output or luminosity output of the display module $\phi_s$, where $\phi_s$=F cd/m$^2$. In this example, the source luminosity of the OLED display under a full lit condition is at 300 cd/m$^2$ (cd per square meter), which is equivalent to 280 Lux at the active display surface in this example.

Luminance is a term which specifies the visual brightness of an object and is a major determinant of perceived picture quality in an LCD. Luminance is commonly referred to as brightness and is specified in candelas per square meter (Cd/m$^2$) or nits.

In order that a luminous pixel or message displayed on the display module is readable under outdoor sunlight conditions, the message must be bright enough. In general, a typical outdoor LCD display requires a luminous level of 1000 nits or more. However, such a high luminance level means a relatively high power consumption and a relatively high heat dissipation, and is not practical or desirable for wearable electronic devices such as a smart wrist watch of the present example.

Furthermore, the display screen of the display module has a relatively high resolution (26-35 pixels per square mm and a pixel pitch of less than 0.2 mm between adjacent pixels. A high luminous level $\phi_s$ at the display screen of the display will result in a substantially blurred displayed message. A source luminosity of, say, between 260 and 350 Cd/m$^2$) has been found to provide a balance between message clarity and readability.

Example acceptable luminance levels of example smart watches when the display module is at 50% or half-lit conditions ($\varnothing_{s_{0.5}}$, which is at 140 Luc in this example) are set out in the table below.

| Reference | Color | Matt surface or glossy surface (shinny) | Luminance (lux) At dial | Luminance (lux) At viewing window | Attenuation by dial member (−lux) |
|---|---|---|---|---|---|
| CH31700 | black | glossy | 40-56 | 20-40 | 84-100 |
| CH31701 | black | glossy | 40-56 | 25-45 | 84-100 |
| FE31800 | black | matt | 25-35 | 10-30 | 105-115 |
| FE31801 | black | matt | 25-35 | 10-30 | 105-115 |
| FE31802 | black | matt | 25-35 | 5-25 | 105-115 |
| FE31803 | black | matt | 25-35 | 10-30 | 105-115 |
| HB31300 | dark grey | glossy | 45-56 | 25-45 | 84-95 |
| HB31301 | grey | glossy | 45-56 | 25-45 | 84-95 |
| LA32000 | dark blue | matt | 25-35 | 10-30 | 105-115 |
| LA32001 | blue | matt | 40-73 | 25-45 | 67-100 |
| LA32002 | green | matt | 55-73 | 25-45 | 67-85 |
| TH31502 | dark grey | matt | 25-35 | 10-30 | 105-115 |
| TH31504 | grey | matt | 25-35 | 10-30 | 105-115 |
| TH31505 | black | matt | 45-56 | 20-40 | 84-95 |
| TH31506 | dark blue | matt | 45-56 | 20-40 | 84-95 |
| TH31507 | black | matt | 45-56 | 20-40 | 84-95 |
| MV33000 | black | glossy | 45-56 | 20-40 | 84-95 |
| MV33001 | black | glossy | 45-56 | 20-40 | 84-95 |

In the table above, the luminance values are measured with the display module under half-lit conditions, that is, at 150 lux when 50% of the pixels are activated and lit and luminous. The half-lit condition is selected as a reference since this would be a good average condition. For example, with the half-lit luminance at the OLED display at 150 lux, the dial member needs to have an attenuation of 110 lux in order to get 40 lux at the dial surface.

The dial member is doped with pigments in order to be translucent. In order to have a high clarity and a low haze, the pigments would need to have the same or matched refractive index as that of the base plastic material.

Example and non-exhaustive refractive index of pigments of different colors are set out below.

| Color | Pigment | Refractive index | Color | Pigment | Refractive index |
|---|---|---|---|---|---|
| Blue | Azurite | 1.73-1.84 | Green | Chrysocolla | 1.58-1.60 |
| | Indigo (natural dye) | 1.49-1.52 | | Dioptase | 1.64-1.71 |
| | Smalt | 1.49-1.52 | | Glauconite (green earth) | 1.62 |
| | Lazurite (natural ultramarine) | 1.50 | | Malachite | 1.65-1.9 |
| | Vivianite (blue ocher) | 1.58-1.70 | | Verdigris (basic copper acetate) | 1.53-1.56 |
| | | | | Volkonskoite | 2.50 |
| Yellow | Gamboge (organic resin) | 1.58-1.59 | Red | Cinnabar | 2.81-3.15 |
| | Indian yellow (organic resin) | 1.67 | | Hematite (red iron oxide) | 2.78-3.01 |
| | Jarosite | 1.71-1.82 | | Realgar | 2.46-2.61 |
| | Massicot (litharge, lead monoxide) | 2.50-2.61 | | Red lead (minium or lead tetroxide) | 2.42 |
| | Goethite (yellow ocher) | 2.00-2.40 | | Vermilion | 2.82-3.15 |
| | Orpiment | 2.40-3.02 | | | |
| Brown | Goethite (brown ocher) | 2.08-2.40 | White | Chalk (whiting, calcium carbonate) | 1.51-1.65 |
| | Siderite | 1.57-1.78 | | Gypsum, anhydrite (calcium sulfate anhydrate) | 1.57-1.61 |
| | Sienna, burnt | 1.85 | | Gypsum, hemihydrate (gesso, calcium sulfate hemihydrate) | 1.52-1.53 |
| | Sienna, raw | 1.87-2.17 | | Titanium dioxide (anatase) | 2.27 |
| | Umber, burnt | 2.20-2.30 | | Titanium dioxide (rutile) | 2.71 |
| | Umber, raw | 1.87-2.17 | | Lead white (basic lead carbonate) | 1.94-2.09 |
| | | | | Zinc oxide | 2.00-2.02 |
| Blacks | Carbon black | (opaque) | | | |

Polycarbonates (PC) have a refractive index of between 1.584-1.586 and pigments of same or comparable refractive index are used to dope a selected polycarbonate to form a sheet-like polycarbonate dial member. Vivianite (blue ocher), chrysocolla, gamboge (organic resin), siderite, gypsum, anhydrite (calcium sulfate anhydrate) are example of pigments that are matched with polycarbonates for the present applications.

An example polycarbonate dial member of the smart watch has a thickness of 0.5 mm. In general, a thickness with the range of between 0.4 and 0.8 mm would be useful for a compact smart watch, and a dial member of other thickness can be used where appropriate, for example, when the half-lit luminosity of the activated pixel elements of the display module is higher than 70 lux.

PMMA is another suitable candidate for formation of a translucent dial member as it transmits up to 92% of visible light at 3 mm thickness, and gives a reflection of about 4% from its surface due to its refractive index (1.4905 at 589.3 nm).

The microcontroller is set to operate in several alternative modes, for example, an analogue watch only mode, a digital mode including a message mode and/or a compass mode, and a hybrid mode comprising the watch-node and the message mode. During the analogue only mode, the smart watch operates in a watch mode and appears like a conventional analogue wrist watch. During the message mode, data will be displayed on a data display window on the smart wrist watch. The data display window is concealed under the watch dial during the analogue watch only mode to maintain appearance integrity of the watch dial surface, under indoor illuminated conditions and outdoor sunlit ambient conditions.

When in the analogue watch only mode, the analogue watch movement is operational to provide time information in a conventional manner through the time arms, that is, hour arm, minute arm, and/or second arm. In some embodiments, the watch movement includes timing arm or uses the time arms to perform timing function without loss of generality. In some embodiments, a watch movement including calendar function is included and a display window for display of calendar information is formed on the display member, which is also referred to as a watch dial. During this mode and under normal ambient lighting conditions, only the dial surface, the time arms and the marker prints are apparent to a user. What is underneath the display member is not visible or apparent to a user due to the partially reflective surface. When in the analogue watch only mode, the microcontroller is in hibernation and the display is not in a luminescent condition.

In use as a wrist watch, a user wears the smart watch on a wrist and the smart watch is to operate like a normal analogue watch.

To operate in the digital mode or the hybrid mode, a user will set up a communication link between the smart watch and an external data device such as a smart phone, a tablet or laptop computer. For example, the user may perform Bluetooth or WiFi pairing steps to pair up the smart watch and the external data device to provide a secured data communication link.

When in the hybrid mode, the wearable device is to operate in both the analogue watch mode and in the digital mode. When in the digital mode, the microcontroller is to set the display into a display mode operation and the display panel will become luminescent with power supplied from the power assembly as controlled by the microprocessor. In this mode, the microcontroller will generate information messages on the display for user reading. The information messages may include, for example, a message alert that there is a new message received, a reminder or other short messages without loss of generality. In some embodiments, a user may operate the smart watch to make a short telephone call or to send a short message out through the smart phone. When in the hybrid mode, the analogue watch movement is not affected and remain in operation. In some embodiments, operation of the analogue movement may be halted during the digital mode operations so that the smart watch is in a pure digital mode operation.

When in the digital mode operation, the electroluminescence of the display panel will generate a visible message by way of localized and confined electroluminescence and the visible message will appear to a user as forming on the dial surface. Due to the localized and confined electroluminescence, what is visible to a user is the data message due to the localized and confined electroluminescence plus what appears on the dial surface during hibernation or non-operation of the electroluminescent display panel, thereby creating a classic analogue watch having the additional data communication function of a smart watch. As voice communication is nowadays modulated in digital form to facilitate transmission, the data communication function also facilitates voice communication without loss of generality.

During data operations when high frequency radio frequency signals, for example, radio frequency signals of 2-5 GHz suitable for Bluetooth or WiFi operations, the partially reflective viewing surface provides a lower RF (radio frequency) resistance gateway to facilitate travelling of RF signals across the device. In some embodiments such as the present, the partially reflective viewing surface is metallic and has an attenuation effect to incident RF signals and will attenuate incident operational radio frequency signals by 3 dB to 5 dB when the incident operational radio frequency signals traverse through the partially reflective viewing surface.

When the wearable device is transmitting, the wireless data transmitter is to transmit operational radio frequency signals so that the RF power immediately outside the device, for example, at immediate proximity to the watch viewing window, is at a power level of between −10 dBm to −30 dBm.

In example embodiments, the smart watch may be configured to optionally operate as a compass. When operating as an electronic compass, the microcontroller (or μP) will operate to receive GPS signals and to translate received GPS signals as orientation information for display. To display orientation information, the microcontroller will operate the mechanical movement assembly so that the arms are moved to positions indicating orientations, for example, in degrees with reference to the North or South direction etc.

While the disclosure has been described with reference to examples and embodiments, the examples and examples and embodiments are not intended to restrict the scope of disclosure and should not be used to limit or restrict the scope of disclosure.

For example, while the Bluetooth or BLE communication protocols have been referred to, other communication norms such as IEE802.11 family or other wireless communication norms are useable without loss of generality.

Furthermore, while a smart watch has been used as a convenient example of a wearable electronic device, other example wearable electronic device may include fitness monitors, health monitors, heart rate monitors having a display panel and an analogue display surface similar or equivalent to a watch dial surface without loss of generality.

In example embodiments, stepper motors are used to operate the time-indicating arms. For example, 3 stepper motors are used to operate the second-arm, the minute-arm and the hour-arm respectively. Each of the 3 arms may operate independently and move in different direction in different speed. Each of the minute-arm and hour-arm move with 360 steps per cycle, while the second-arm moves with 60 steps per cycle. In a watch mode and in the first mode of operation when the smart watch is to appear visually as a conventional analogue watch only, the second-arm moves one step every second, the minute-arm moves one step every 10 seconds, and the hour-arm moves one step every 120 seconds.

In the second mode of operation when the smart watch is to generate a luminous message for user viewing, the electronic assembly 140 will check if the arms are above and crosses the luminous display surface 162a and move the arms away from the luminous display surface 162a such that the arms would not obstruct viewing of the luminous message. In an example, as depicted on FIG. 1A, the luminous display surface 162a is at the lower part of the viewing window 114. Taking 12 o'clock position as the 0° and the center axis of the dial surface as the origin, the luminous display surface 162a is at a viewing angle range between around 132° to around 228° on the viewing window 114, which correspond to approximately 22 minute position to 38 minute position. If the arms are within the viewing angle range, they will be instructed to move to target positions which are outside the viewing angle range. For example, the second and minute arms may be instructed to move to 90°, corresponding to 15 minute position, and the hour-arm may be instructed to move to 270°, corresponding to 45 minute position. The luminous display surface 162a may be located at the upper part of the viewing window 114, or left or right side of the viewing window 114 without loss of generality. The viewing angle may comprise any range taken between 0° to 360°, for example 0° to 48°, 42° to 138°, 222° to 318°, 222° to 318°, 312° to 360° or combinations of two or more ranges between 0° to 360°. The arms may be instructed to move to any other target positions.

The electronic assembly 140 operates to determine the direction of movement of the arms in reaching the target positions. The current positions of the arms are stored in the memory in the microprocessor. For each of the arms may move in clockwise or anti-clockwise in different speed. The microprocessor calculates the distance from the current position to the target position in both clockwise and anti-clockwise directions, compares whether the arm could reach the target position in a shorter time by moving clockwise or anti-clockwise, and instructs the stepper motors to turn accordingly.

In an example embodiment, the arm moves at 64 Hz in clockwise direction and at 32 Hz in anti-clockwise direction, the electronic assembly 140 determine the direction of movement as follows:—
1. Calculating the number of steps required for moving the arm from the current position to the target position in clockwise direction (P)
2. Calculating the number of steps required for moving the arm from the current position to the target position in anti-clockwise direction (Q)
3. if (P/2)>Q, instructing the arm to move Q steps in anti-clockwise direction; otherwise instructing the arm to move P steps in clockwise direction.

In some embodiments, it is envisioned that the arm may move with varied frequencies or speed when using different driving module or according to different settings. The comparison by the electronic assembly 140 may be adjusted accordingly. For example, when all arms move at 64 Hz in clockwise direction and at 16 Hz in anti-clockwise direction, the electronic assembly 140 will instruct the arm to move in anti-clockwise direction when (P/4)>Q.

The example smart watch is optionally also operable as an electronic compass. The example smart watch obtains current compass reading by a built-in magnetometer or embedded GPS units. To convert into compass operation while in a watch mode, at least one of the arms of the example smart watch move to a target arm position, pointing to a compass direction as if an ordinary compass dial. The rest of the arms or parking arms move to a target arm position and stay at the target arm position until the end of the compass operation.

In an example compass mode, the second-arm parks at its target arm position, the minute and hour arms move to their corresponding target arm positions according to the current compass reading C. For example, the second-arm parks at 90°, corresponding to 15 minute position. The minute-arm moves to a minute target position M, where M=(360−C) position, and the hour-arm moves to an hour target position H, where H=(540−C) position. If M or H is bigger than or equal to 360, it may be adjusted by minus 360.

The electronic assembly 140 is operable to calculate the direction of movement of the arms, such that the arms move as fast as possible to the target positions. For example, when both arms move at 32 Hz for both clockwise and anti-clockwise directions, the electronic assembly 140 determine the direction of movement as follows:—
1. Calculating the number of steps required for moving the arm to the target position in clockwise direction (P)
2. Calculating the number of steps required for moving the arm to the target position in anti-clockwise direction (Q)
3. if P>Q, instructing the arm to move Q steps in anti-clockwise direction; otherwise instructing the arm to move P steps in clockwise direction.

Furthermore, while a smart watch has been used as a compass, other example smart watch may be programmed for other purpose without loss of generality. For example, the smart watch may utilize the GPS information and operable as a direction pointer. In this case, instead of pointing to a compass direction, the arms are programmed to point to the direction to a location.

A power supply apparatus in the form of an example battery charger 200 comprises a main housing 210, a charging mechanism 220 and attachment means 230, as depicted in FIGS. 6A to 6F. The main housing 210 comprises a first housing portion 212 and a second housing portion 214 which cooperate to define a hollow main compartment for receiving the charging mechanism 220 and the attachment means 230. Each of the first housing portion 212 and the second housing portion 214 is molded of hard plastics and is formed as a clam shell. The first housing portion 212 and the second housing portion 214 are joined together, for example, by permanent joining methods such as ultrasonic welding or gluing, or by releasable joining method such as by screwing. The first housing portion 212 comprises a ceiling portion and a first peripheral wall portion surrounding the ceiling portion to define a first compartment portion. The second housing portion 214 comprises a base portion and a second wall peripheral portion surrounding the base portion to define a second compartment portion. When the first housing portion 212 and the second housing portion 214 are joined together to form the charger, the first peripheral wall portion and the second peripheral wall portion are in abutment, and the first compartment portion and the second compartment portion are added or concatenated to form the hollow compartment. When the first housing portion 212 and the second housing portion 214 are joined together to form the charger, the first peripheral wall portion and the second peripheral wall portion are concatenated to form a main peripheral wall. The main peripheral wall extends in an axial direction X-X' between the base portion and the ceiling portion to define the thickness of the main housing and extends peripherally to surround the hollow main compartment.

In this example, the first housing portion 212 defines a substantial portion of the hollow main compartment and the first compartment portion defines substantially the entirety of the hollow main compartment. In this example, the first peripheral wall portion has an axial extent which is substantially larger than the axial extent of the second peripheral wall portion and the first compartment portion is substantially larger than the second compartment portion.

The example charger 200 is a miniaturized charger adapted for attaching to, for example, a battery-operated wrist-watch for charging a battery inside the wrist watch. A typical wrist watch has a diameter of between 20 mm to 45 mm and the main housing of the miniaturized charger is optionally sized to have lateral dimensions substantially smaller than the diameter of the wrist watch. The lateral dimension of the main housing is measured with respect to and is transversal to the axial direction of the battery charger, and the example axial direction is in the direction of attachment of the charger to the wrist watch.

The charging mechanism 220 comprises electronic circuitry and charging contact means. The electronic circuitry and the charging contact means are mounted on an example rigid mounting board 222, for example, a rigid printed circuit board (PCB), as depicted in FIGS. 8A to 8C and FIG. 9. The example mounting board 222 comprises an upper surface on an upper side of the mounting board 222 and a lower surface on a lower side of the mounting board 222 which is opposite facing to the upper surface. The mounting board 222 is transversely disposed so that both the upper surface and the lower surface are orthogonal or substantially orthogonal to the axial direction. In this example, the upper surface of the printed circuit is facing upwards and facing the ceiling portion and the surface of the printed circuit is facing downwards and facing the base portion.

The example charging contact means comprises contact electrodes 224 for making electrical contact with compatible or corresponding charging contact terminals on the wrist watch. In this example, the charging contact means comprises a pair of contact electrodes 224 which is supported on the rigid mounting board 222. The contact electrodes 224 extend axially and projects axially downwards through the base portion of the main housing 210 to facilitate power transfer contact with an external target device. Each of the contact electrodes 224 is resiliently biased and is retractable between a first axial position and a second axial position. An example first axial position corresponds to a maximum axial extent of projection of the contact electrode 224 outside the main housing. This example first axial position corresponds to a spring neutral state or a lightly biased state when the charger 200 is or its contact electrodes 224 are not pressed axially against a rigid surface. An example second axial position corresponds to a minimum axial extent of projection of the contact electrode 224 outside the main housing 210 and a maximum axial extent of the contact electrode 224 inside the main housing 210. This example second axial position corresponds to a highly biased state when the contact electrodes 224 are subject to an applied compressive force which acts to retract the contact electrode 224 into the interior of the main housing 210. This example second axial position typically corresponds to a power transfer contact state when the battery charger 200 and a target device are in power transfer contact. The contact electrodes 224 are in compressive physical and electrical contact with the target device when in the power transfer contact state.

Each of the example contact electrodes 224 is under spring bias. In this example, the contact electrode 224 is biased by a helical spring 226 which is retained inside the main housing between the mounting board 222 and the base portion. The retained helical spring 226 has a center axis and is axially extendable between a second, shorter, axial length, corresponding to the second axial extent of the contact electrode 224, and a first axial length, corresponding to the first, longer, axial extent of the contact electrode 224. The retained helical spring 226 is axially retractable between a first axial length, corresponding to the first, longer, axial extent of the contact electrode 224, and a second, shorter, axial length, corresponding to the second axial extent of the contact electrode 224. The contact electrode 224 comprises an elongate conductive body having a longitudinal body axis and is physically and electrically attached to the helical spring 226. In this example, the longitudinal body axis of the conductive body of the contact electrode and the center axis of the helical spring are aligned or co-axial. As depicted in FIG. 8B, an upper axial end of the conductive body of the contact electrode 224 is received inside the helical spring 226 and a free axial end of the helical spring 226 is in abutment contact with an upward facing surface of the conductive body. The upward facing surface of the conductive body which is in abutment contact with the helical spring 226 is at an axial level intermediate the upper axial end and the lower axial end of the conductive body, that is below the upper axial end. The upward facing surface of the conductive body is an enlarged surface which is orthogonal to the helical spring center axis so that the upward facing surface of the conductive body and the helical spring 226 are incompressible abutment contact when in the power transfer state. In this example, the longitudinal body axis of the conductive body defines the axial direction of the battery charger 200, and the longitudinal body axis of the conductive body and the helical spring center axis are aligned with the axial direction of the battery charger 200.

In this example, the contact electrode 224 comprises a conductive main body 224a having an engagement surface on the main body. The example conductive main body 224a is cylindrical and the longitudinal body axis is the cylindrical axis of the main body. The upward facing surface of the conductive body functions is an example engagement surface for engaging with the helical spring 226. The upward facing surface also functions to limit the maximum and/or minimum axial extent of movement of the conductive main body 224a relative to the main housing 210 or the mounting board 222.

The example conductive main body of the contact electrode 224 is rigid, elongate and comprises a conductive metal pin 224b, for example, a copper pin or a copper alloy pin. The conductive metal pin 224b has a lower end surface at a lower axial free end and a peripheral surface surrounding the lower end surface. The lower end surface is for making electrical contact with a corresponding charging terminal on a target device and is bare or exposed. The peripheral surface proximal the axial end may be insulated or exposed. In this example, peripheral surface proximal is exposed. The example lower end surface is substantially circular and has a diameter of about 1 mm to facilitate a flow of current in the milliampere range, for example, below 5 mA or between 5 mA and 10 mA. Of course, the cross-sectional area of the conductive metal pin 224*b* may vary according to power transfer requirements and/or the contact surface area of the charging terminal of the target device. When in the power transfer state, the lower end surface of the conductive metal pin 224*b* is in compressive contact abutment with the contact surface area of the charging terminal of the target device.

Figure 10A:
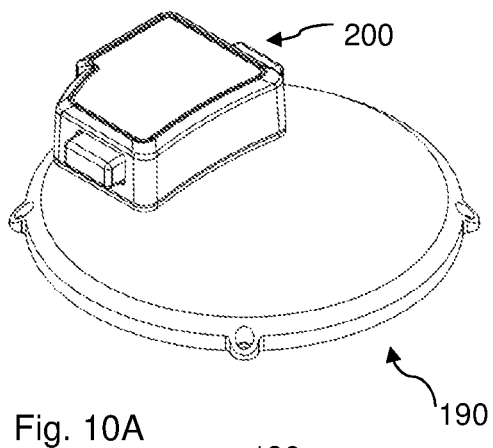
Figure 10B:
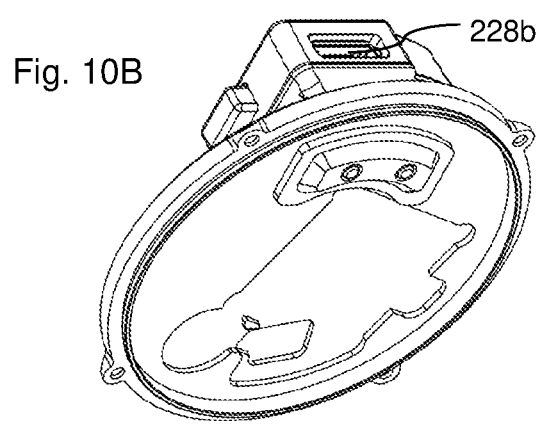
Figure 11A:
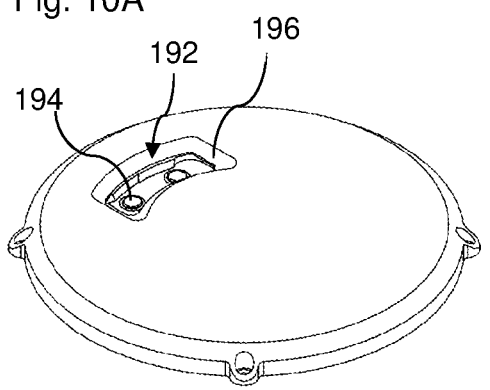
FIGS. 11A and 11B are perspective views of the example back cover 190 of the example target device shown on FIG. 10A.
Figure 11B:
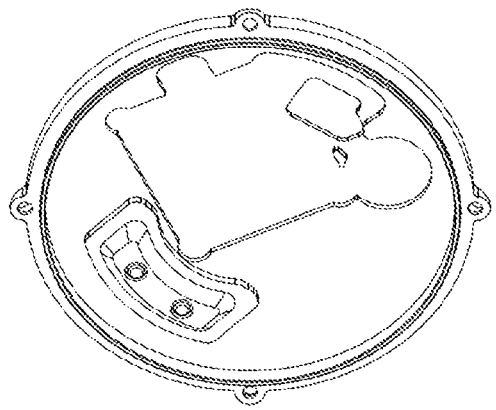
Figure 12:
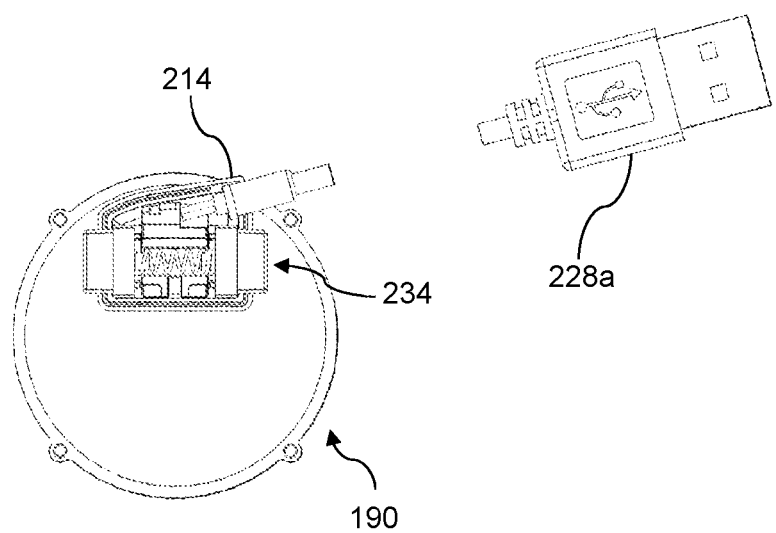
FIG. 12 is a plan view of another example battery charger according to the present disclosure.

The electronic circuitry is adapted to provide charging power of the battery charger 200. In this example, charging power is supplied by an external power source which is to supply a 5V DC (direct current) power and which is connected to an input end of the charging mechanism. The input end of the charging mechanism comprises two contact pads on the PCB, one is a positive contact pad marked 5V and the other is a negative or ground contact pad marked GND. The external power source is connected to the battery charger 200 at the positive and negative input contact pads. In this example, positive and negative conductor ends of a power cord, for example, a power cord having a USB connector at a power supply end, are connected to the input contact pads on the PCB to facilitate external power supply to the battery charger 200. In some embodiments, the battery charger 200 may have a built-in power source, for example, a battery pack or a battery pack which is inside the main housing. In some embodiments, the battery charger may have a plug or a socket, for example, a USB plug 228*a* as shown in FIG. 12 or a USB socket 228*b* as shown in FIG. 10B, for detachable connection to an external battery pack. The optional plug or socket may be formed on the first housing portion, for example, on the ceiling portion of the first housing portion.

The positive and negative input contact pads are connected respectively to the positive and negative contact electrodes 224 for charging power output to the target device. More specifically, the positive and negative contact pads are connected respectively to the positive and negative contact electrodes 224 by a printed circuit formed on the PCB, by components mounted on the PCB and by the helical springs 226. The helical springs 226 provides spring urge on the contact electrodes 224 and are made of a good conductor of electricity. To facilitate reliable power supply to the contact electrodes 224, a free end of each of the helical springs 226 is soldered to a contact pad on the lower side, which is an underside, of the PCB. The contact electrode 224 is optionally soldered to the helical spring 226 for reliable contact. The PCB is mounted on the lower housing portion or second housing portion 214, for example, by screws, and the helical springs 226 are retained between the PCB and the base portion of the PCB. The contact electrodes 224 projects axially outside the main housing 210 to facilitate charging contact.

To permit passage of the contact electrode 224 through the main housing 210, a pair of through apertures is formed on the base portion of the lower housing. The through apertures are separated by a lateral distance equal to the lateral separation distance of the charging terminals on the target device. The through apertures on the base portion of the main housing 210 permits a limited range of axial movement of each of the contact electrodes 224. To facilitate charging contact, each of the contact electrodes 224 protrudes from the base portion and extends axially downwards to project beyond the base portion axially.

The example attachment means 230 is for releasable engaged attachment of the battery charger 200 to the target device, which is a wrist watch in this example. In some embodiments, the charger may be releasably attachable to other electronic devices such as mobile phones, tablet computers, or other mobile electronic devices, for charging or for power supply without loss of generality. In this example, the attachment means 230 is for releasable attachment of the battery charger 200 to the case of the target device, and the attachment means 230 comprises a latching mechanism. In some embodiments, the battery charger may be attached to the target device by magnets, by snap fasteners or other releasable attachment means without loss of generality.

The example attachment means 230 is supported on the main housing. More specifically, the example attachment means is supported by a support structure 232 which is mounted on the main housing 210 or on the mounting board 222, for example, on the second housing portion 214. The attachment means 230 comprises a latching means which is operable by an actuating means. The example actuating means comprises a pair of oppositely facing push buttons 234 which are moveable through a pair of opposite facing side windows to correspondingly operate a pair of latching hooks 236*a*. Each of the push button 234 comprises a hollow inner body portion 234*a* which is retained inside the hollow main compartment and an hollow outer body portion 234*b* which is in abutment with the inner body portion 234*a* and which projects outside the main housing. The inner body portion 234*a* has an end surface which functions as a stop means to prevent passage of the inner body portion through the side windows. In this example, the inner body portion 234*a* has a cross-sectional area which is larger than the cross-sectional area of the window and larger than the cross-sectional area of the outer body portion 234*b*. A stepped end surface which faces the side window is formed at a junction formed by the inner body portion 234*a* and the outer body portion 234*b* to function as a stop surface to prevent passage of the inner body portion 234*a* out of the main housing 210. Each of the side windows is formed on a lateral side of the main housing 210 and defines a window aperture. The example side window is defined by an open side aperture which is formed on a lateral side of the first peripheral wall portion and defined by three sides but no bottom side. The bottom end of the side aperture cooperates with the base portion of the second housing portion 214 to define the bottom side of the side aperture.

The window apertures of the side windows are optionally of same shape and dimensions to promote lateral symmetry and so that the charger requires less component types. The opposite facing windows are formed on the first peripheral wall portion of the first housing portion 212 and are at a same axial level. Each of the windows has an aperture which is shaped and dimensioned to follow closely the cross-sectional shape and dimensions of the outer body portion. A power cord entry aperture is formed on one of the lateral surfaces of the first peripheral wall portion of the first housing portion and adjacent the side window to facilitate entry of a power cord, for example a power cord having a USB plug 228*a* at its free end, as depicted in FIG. 12 in which the first housing portion 212 is removed and the second housing portion 214 is in abutment with the back cover 190 of the watch. In some embodiments, a rigid connector may be integrally formed on the main housing and the power cord or the power cord entry aperture is not necessary.

The latching mechanism comprises a pair of latching members 236. The pair of latching members 236 comprises a first latch which is mounted on a first lateral side of the main housing 210 and a second latch which is mounted on a second lateral side of the main housing 210. Each example latching member is a hook-like member comprising an elongate latch body, a latching device at a longitudinal end of the latch body and a retention device at a longitudinal end of the latch body distal from the latching device. The latching device in this example is a latching hook 236a and the example retention device is an eyelet 236b. The latching hook 236a has its hooking end facing outwards for latching on a target device, and the hooking ends of the latching hooks 236a of the pair of latching members 236 are opposite facing and facing away from each other. The latch body comprises an upper plate portion on which the eyelet 236b is defined and an elongate portion which extends between the end plate portion and the latching hook 236a. The latching member 236 is suspended on a support shaft by means of the eyelet 236b. The eyelet 236b is shaped and dimensioned to slide on the support shaft 238. The support shaft 238 comprises an elongate axle body having a shaft axis and an enlarged head portion on a longitudinal end. The support shaft extends transversely along a transversal direction and is aligned with the centers of the side windows. The latching member 236 enters the support axle from a longitudinal end which is distal from the eyelet 236b and the enlarged head portion and the enlarged head portion is shaped and/or dimensioned to prevent the latching member from moving beyond the head portion. The latching member 236 and the support axle cooperate to form a latching sub-assembly.

The support structure 232 comprises a molded plastic body on which a transversely extending groove having a semicircular cross-section is formed. A helical spring 240 to enable resilient reciprocal operations of the actuation means is placed on the groove. The groove and the center axis of the helical spring 240 is aligned with the centers of the side windows to facilitate reciprocating operation of the actuation means. The latching sub-assemblies are assembled with the helical spring 240 and the push buttons 234 to form the latching mechanism.

To form the latching mechanism, the enlarged head portion of the support shaft 238 is placed inside a longitudinal end of the helical spring 240. The helical windings of the helical spring 240 are adapted to retain the head portion of the support shaft 238, for example, by radial compressive friction, when the head portion is placed inside a longitudinal end of the helical spring 240. Another longitudinal end of the support shaft 238 which is distal from the head portion is received inside the push button 234 such that an inner end of the inner body portion of the push button is in abutment with the end plate portion of the latching member 236. The latching assembly, comprising the latching sub-assemblies, the support structure 232, the helical spring 240, and the push buttons 234 are then mounted and retained on the first housing portion 212, to form the latching mechanism. The first housing portion 212 is then fastened on the second housing portion 214 to form the battery charger assembly. When the charger is assembled, the latching sub-assemblies are on opposite lateral sides of the support structure 232 (that is, on opposite lateral sides of the main housing 210), and the outer body portions of the push buttons 234 protrude through the opposite side windows and extend in opposite directions.

When in the assembled state, the support shaft 238 is elevated above the mounting board 222 and the hooking end of the latching device is below the mounting board 222. The latching sub-assemblies on the first and second lateral sides of the main housing 210 are axes-aligned (that is, with the axes of the support shaft 238 aligned) and are connected by helical springs 242 which also functions as a bridging helical spring to form the latching assembly.

In this example, the latching mechanism and the actuation means are configured such that the latching means are in a latching state when the push buttons 234 are in their natural and unactuated state, and the latching means are in a releasing state when the push buttons 234 are in their actuated state. When in the unactuated state, the push buttons 234 extend through the side windows due to a laterally outward urge of the helical spring and the inner body portions of the push buttons 234 are in abutment contact with the side windows and are prevented from moving through or beyond the side windows. When in the actuated state, the push buttons are pushed inwardly towards each other against the outward urging force of the helical spring and retract into the main housing 210 due to application of a compressive force on the opposite facing push buttons 234 and against the spring urge.

When in the latching mode, the hooking ends of the latching hooks 236a protrude outside the main housing 210 and are configured to cooperate with corresponding latching or engagement means on a target device. When in the releasing or unlatching mode, the hooking ends of the latching hooks 236a are retracted towards the main housing 210 so that the hooking ends of the latching hooks 236a are inside the main housing 210 or are still outside the main housing 210 but insufficient to enter into latching engagement with the corresponding latching or engagement means on a target device.

To operate the actuation means, a user is to apply a compressive force on the push buttons 234. The compressive force is to be applied along the axes of the support shafts 238 or along the axis of the supporting helical spring. Since the upper plate portion of the latching member 236 is in abutment with an inward facing ends of the inner body portion of the push button 234, inward movement of the push buttons 234 will drive the latching members 236 to move inwardly to retract the hooking ends into the releasing state.

The battery charger 200 comprises an example protrusion portion 216 which protrudes from main housing 210. In this example, the protrusion portion 216 protrudes from the second surface of the main housing 210 and has the appearance of a bump on the main housing 240.

Referring to FIGS. 6B, 6C, 6D and 6E, the example protrusion portion 216 comprises a base portion which is on the second surface of the main housing 210 and a forward portion which is on an axial end of the main housing 210 distal from the first surface of the main housing 210. The forward portion has a forward surface defining an axial end of the apparatus. The forward surface is distal from the base portion and distal from the first surface of the main housing, and is axially displaced from the second surface of the main housing, the axial displacement being in the axial direction of the contact electrode 224 as a convenient reference. The example forward surface is substantially parallel to the second surface but axially displaced. The base portion and the forward portion are connected by a peripheral surface of a peripheral wall. The protrusion portion 216 is formed as an integral part of the second housing portion 214, for example, by injection molding or 3-D printing. The protrusion portion 216 has an internal cavity which is defined by cooperation of the peripheral wall and the forward surface of the forward portion. The protrusion portion 216 is shell-like portion defining the internal cavity. The peripheral wall joins the second surface at the base portion and delineates an intermediate aperture on the second surface. The internal cavity and the internal compartment of the main housing 210 are communicable, that is fluidly communicable, thorough the intermediate aperture. The contact electrodes 224 pass axially through the internal cavity and then protrude through the forward surface of the shell-like portion which is on an axial end of the main housing 210 to protrude out of the main housing to facilitate the making of external electrical contacts.

Figure 6A:
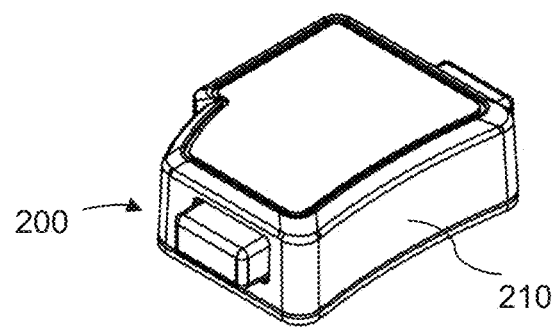
FIGS. 6C and 6D are side elevation views of the example battery charger 200 of FIG. 6A.
FIG. 6E is a bottom view of the example battery charger 200 of FIG. 6A.
FIG. 6F is a cross-sectional view of the example battery charger 200 of FIG. 6A taken along a section line Y-Y' shown on FIG. 6E.
Figure 6B:
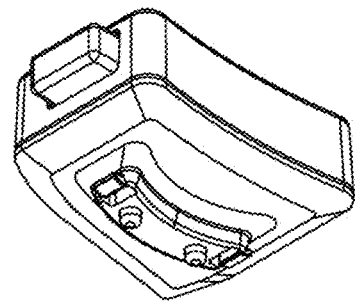
Figure 6C:
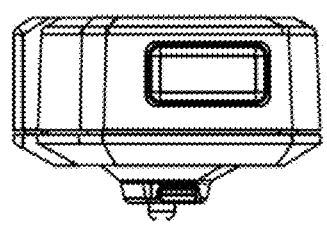
Figure 6D:
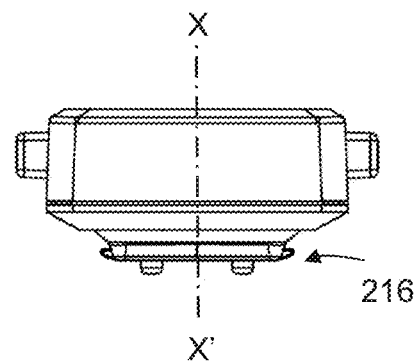
Figure 6E:
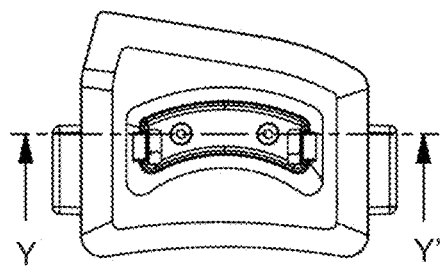
Figure 6F:
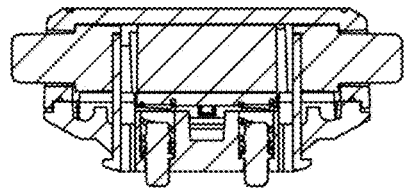
Figure 9:
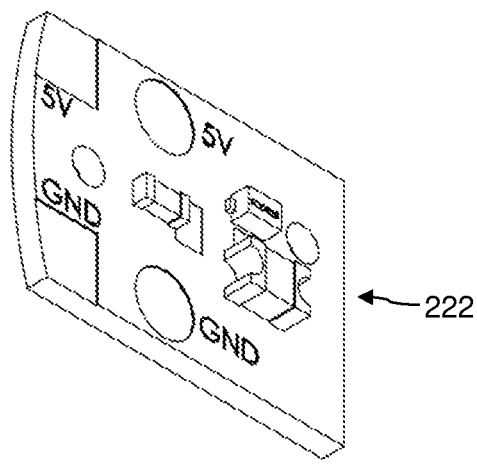
FIG. 9 is a perspective view of the example printed circuit board (PCB) of the example battery charger 200 of FIG. 8C, FIGS. 10A and 10B are perspective views of the example battery charger 200 attached to the example target device.

The protrusion portion 216 is elongate and extends in a generally transversal direction parallel to the transversal axis defined by the support shaft 238 or the helical spring 240 supported on the support structure 232. Referring to FIGS. 6B, 6E and 6F, the protrusion portion 216 extends transversely along a transversal axis Y-Y' formed by joining the two contact electrodes 224. The protrusion portion 216 also extends transversely along a transversal axis formed by joining the two latching members 236. The protrusion portion 216 has a tapered shape and gradually tapers to narrow as it projects axially from the base portion and extends towards the forward end of the forward portion. The protrusion portion 216 is defined by two parallel curves on opposite sides of the transversal axis Y-Y' and is non-symmetrical about the transversal axis Y-Y'. On the other hand, the protrusion portion 216 is laterally symmetrical about a central plane which is parallel to the axial direction X-X' and midway between the contact terminals or midway between the latching members 236. The tapered protrusion portion 216 plus the tapered protrusion requires a specific connection dexterity and mitigates risks of incorrect electrical connection due to incorrect manner of insertion. In this example, the protrusion portion 216 has a crescent shape defined between the two parallel curves. The crescent shaped protrusion portion 216 extends in the direction of the transversal axis Y-Y' but is non-symmetrical about the transversal axis. The two latching members 236 are at the two lateral longitudinal ends of the protrusion portion 216, and the two contact electrodes 224 are intermediate the two latching members 236.

In this example, a pair of contact electrodes 224 protrudes from the base portion of the second housing portion 214 to facilitate power transfer connection. In some embodiments, a single contact electrode is used and the latching member may function as a power transfer contact, for example, electrically connected to the GND or ground of the electronic circuitry.

Referring to FIGS. 10A to 10B, and 11A to 11B, the example battery charger 200 is releasably attached to the back cover 190 of the watch on which a charger receptacle 192 is formed. The charger receptacle 192 is formed as an indentation on a back cover 190 of the watch casing. The charger receptacle 192 comprises a base surface on which a pair of exposed contact terminals 194 is disposed, and a receptacle peripheral wall which surrounds the base surface. The receptacle peripheral wall extends generally in an axial direction from the base surface towards the back cover 190 of the wrist watch and delineates the boundary of an entry aperture to the charger receptacle 192 on the back cover 190. The back cover 190 of the watch case is the portion of the watch casing which is usually in abutment contact with the wrist of a watch wearer. The back cover 190 defines a back surface of the watch case and is opposite facing to and distal from the viewing window of the wrist watch. The contact terminals 194 are connected to a rechargeable battery inside the smart watch and the rechargeable battery will be charged when charging power is supplied to the battery charger. The watch casing, including the back cover, is made of metal, for example, stainless steel. The contact terminals 194 are electrically insulated from the back cover 190, for example, by insulating and sealing O-rings and/or other sealing and/or insulating means without loss of generality. The charger receptacle 192 are shaped and dimensioned to facilitate closely-fitted reception or snap-fit reception of the protrusion portion 216 of the battery charger 200. An engagement means is formed on the receptacle peripheral wall to cooperate with the attaching means of the battery charger 200 to facilitate releasable attachment between the battery charger 200 and the target device. To facilitate closely-fitted reception or snap-fit reception of the protrusion portion 216, the protrusion portion 216 and the charger receptacle 192 are correspondingly and complementarily shaped and compatibly dimensioned. The engagements means on the charger receptacle 192 is for entry into releasable engagement with the attachment means on the battery charger 200. In this example, the engagement means is formed on at an axal level of the receptacle peripheral wall corresponding to the axial level of the attachment means on the main housing 210 with respect to the forward surface. The example engagement means is a catch means comprising a pair of catches formed on the receptacle peripheral wall. The catch comprises a recess defined between a radially extending flange 196 and the base surface of the charger receptacle 192. The flange 196 protrudes from an inner lateral edge of the receptacle peripheral wall and extends towards the axial center of the charger receptacle 192 and towards another protruding on an opposite lateral edge of the charger receptacle 192. The flanges 196 are oppositely facing and facing towards each other and cooperate to define a catch indentation on opposite lateral sides of the receptacle peripheral wall. The catch indentation extends between the base surface of the charger receptacle 192 and the flanges 196. The example receptacle peripheral wall flares to widen on extending from the flange 196 towards the top of the charger receptacle 192 at the back cover 190. The flaring of the example receptacle peripheral wall is to correspond and complementary with the tapering of the protrusion portion 216.

When the battery charger 200 is inserted into the charger receptacle 192 in the axial direction, with the forward portion of the protrusion portion 216 forwardly approaching the base surface of the charger receptacle 192, the attaching means of the battery charger 200 on encountering the engagement means on the peripheral wall of the charger receptacle 192 will automatically enter into releasable engagement with the engagement means. When the battery charger 200 and the target device are in the releasable engagement, the bubble-like protrusion portion 216 is received inside the charger receptacle, and the axial ends of the contact electrodes 224 are in compressive electrical contact with the contact terminals 194 on the base surface of the charger receptacle 192 and power transfer facilitating electrical connection is established between the battery charger 200 and the target device. When the battery charger 200 and the target device are to be detached, a user can operate the push buttons 234 on opposite lateral sides of the charger main housing by applying a compressive force along the transversal axis Y-Y' to move the latching members 236 into the unlatching state and then separate the battery charger 200 and the target device.

In general, the attachment means on the battery charger 200 and the corresponding engagement means on the charger receptacle 192 are arranged to enter into snap engagement, wherein the battery charger 200 is axially inserted into the charger receptacle 192 in the axial direction and enter into snap engagement upon completion of entry into the charger receptacle 192 and retained by the charger receptacle 192, and more specifically, by catching means on the charger receptacle 192. The attachment means may include retractable hooks such as those described herein or other types of snap-fasteners without loss of generality. In the present example, the charger receptacle 192 and the protrusion portion 216 are configured so that the retractable latching hooks 236a, which protrude from the lateral sides of the protrusion portion 216, on encountering the receptacle peripheral wall will initially retract into the main housing 210 against the resilient urge of the helical spring 240 on the support structure 232 and then re-protrude when reaching the base surface of the charger receptacle 192.

The snap on attachment arrangement makes attachment convenient and the non-symmetrical protrusion portion 216 facilitates easier and expeditious correct physical and electrical connections between the charger and the target device, and the push-buttons facilitates easier and expeditious physical and electrical connections. The crescent shaped protrusion portion 216 provides safeguard against insertion in a wrong direction which may be damaging.

According to the present invention, in combination a watch and a power supply apparatus or a charging apparatus, wherein the watch comprises a watch casing having a charger receptacle which is complementarily and correspondingly shaped to receive the protrusion portion; wherein the charger receptacle has a base surface and a peripheral wall which extends around the base surface to define a receptacle compartment having an entry aperture; wherein anchoring means is formed on the peripheral wall to facilitate cooperation with the attachment means of the apparatus to form the releasable latched engagement; and wherein exposed contact terminals are formed on the base surface of the charger receptacle.

In some embodiments, the watch casing has a casing surface, the entry apertures is formed on the casing surface and the base surface of the charger receptacle is retracted from the casing surface; and wherein when the apparatus is in releasable latched engagement with the target device, the protrusion portion is received inside the charger receptacle and the second surface of the main housing is in abutment with the casing surface.

While the example apparatus is a charging apparatus, persons skilled in the art would appreciate that a charging apparatus also functions as a power supply apparatus without loss of generality.

While the battery charger has a pair of contact electrodes, it would be appreciated that the charger in some embodiments may have a single protruding contact electrode, and the latching means or the forward surface may form a reference circuit contact or GND without loss of generality.

Table of numerals

| 100 | Apparatus | | |
|---|---|---|---|
| 110 | Main housing (main case) | 120 | Mechanical movement assembly |
| 112 | Internal compartment (main case) | 122 | Driving module |
| 114 | Viewing window | | |
| 116 | Bezel | | |
| 118 | Viewing aperture (bezel defined) | 140 | Electronic assembly |
| Z | Main axis of watch case | | |
| 160 | Display assembly | 180 | Component holding assembly |
| 162 | Display module | 182a | First holder member |
| 162a | Active display surface (display module) | 182b | Second holder member |
| 164 | Dial member (or watch dial) | | |
| 164a | Dial surface (viewable surface) | | |
| 190 | Back cover | 192 | charger receptacle |

Table of numerals -continued

| 194 | contact terminals | 196 | flange |
|---|---|---|---|
| 200 | battery charger | | |
| 210 | main housing of battery charger | 212 | first housing portion |
| 214 | second housing portion | 216 | protrusion portion |
| 220 | charging mechanism | 222 | mounting board |
| 224 | contact electrodes | 226 | helical spring |
| 224a | conductive main body | 224b | conductive metal pin |
| 228 | USB plug | | |
| 230 | attachment means | 232 | support structure |
| 234 | push buttons | | |
| 234a | inner body portion | 234b | outer body portion |
| 236 | latching member | | |
| 236a | latching hook | 236b | eyelet |
| 238 | support shaft | 240 | helical spring |
| 242 | helical spring | | |
| X-X' | axial direction | Y-Y' | transversal axis |

The invention claimed is:

1. A battery charger comprising a main housing, an internal compartment inside the main housing and extending between a first base surface and a second base surface, a main housing peripheral wall interconnecting the first base surface and the second base surface, a battery charging circuit inside the internal compartment, an engagement portion integrally formed with the main housing and protruding from the first base surface of the main housing and extending in an axial direction away from the internal compartment to define an end surface on an axial free end of the engagement portion distal from the first base surface, an engagement portion peripheral wall interconnecting the first base surface and the end surface, a pair of battery charging terminals or one battery charging terminal protruding axially from the end surface, a pair of self-engaging latches which is under a resilient bias of an internal spring arrangement to protrude laterally outwards and away from the engagement portion peripheral wall, and a pair of press buttons on opposite lateral sides of the main housing peripheral wall operable to retract the latches inwardly towards the pair of battery charging terminals and inwardly away from the engagement portion peripheral wall; wherein the protruding engagement portion has a lateral profile which is shaped and dimensioned for insertion into a correspondingly shaped and dimensioned battery charger receptacle along the axial direction, and the self-engaging latches are shaped dimensioned and positioned to retract inwardly towards the battery charging terminal upon encountering the battery charger receptacle until reaching a latching portion on the battery charger receptacle whereat the self-engaging latches are to move laterally outwards due to the resilient bias to enter into releasable latched engagement with the latching portion.

2. The battery charger according to claim 1, wherein the engagement portion has a tapered or curved lateral profile for entering into closely-fitted releasable latched engagement with a corresponding shaped and dimensioned battery charger receptacle, and wherein the engagement portion tapers to narrow towards the end surface.

3. The battery charger according to claim 1, wherein the main housing has a lateral extent and an axial extent, the lateral extent being measured in a direction orthogonal to the axial direction and defined between the lateral sides of the main housing peripheral wall, and the axial extent being defined between the first base surface and the second base surface; and wherein the lateral extent is substantially larger than the axial extent.

4. The battery charger according to claim 3, wherein the main housing has an axial extent of between 6 mm and 8.5 mm; and/or the main housing has lateral extent of between 18 mm and 25 mm.

5. The battery charger according to claim 1, wherein the engagement portion is elongate and extends in a direction orthogonal to the axial direction to define a lateral direction, wherein the engagement portion has a lateral extent measured in the lateral direction and an axial extent defined between the end surface and the first base surface, and wherein the lateral extent is substantially larger than the axial extent.

6. The battery charger according to claim 5, wherein the engagement portion has an axial extent of between 2 mm and 2.5 mm; and/or the engagement portion has a lateral extent of between 11 mm and 15 mm.

7. The battery charger according to claim 1, wherein the end surface has a surface area of between 0.35 cm$^2$ and 0.5 cm$^2$; and/or the first base surface has a surface area of between 3 cm$^2$ and 4 cm$^2$; and/or the end surface has a width of between 3 mm and 4 mm, the width being measured in a direction orthogonal with respect to the axial direction and orthogonal to a longitudinal axis of the engagement portion.

8. The battery charger according to claim 1, wherein the engagement portion has a volume of between 80 mm$^3$ and 100 mm$^3$; and/or the main housing or the internal compartment has a volume of between 2 cm$^3$ and 3 cm$^3$.

9. The battery charger according to claim 1, wherein the battery charging terminal comprises an electrically conductive pin which is resilient biased to protrude form the end surface and which is retractable axially towards an interior compartment of the engagement portion.

10. The battery charger according to claim 1, wherein the main housing and the engagement portion are integrally molded of hard thermoplastics and/or the engagement portion is integrally formed as a plastic bead projecting axially from the first base surface.

11. An apparatus comprising a battery-operated smart wrist watch and a battery charger comprising a main housing, an internal compartment inside the main housing and extending between a first base surface and a second base surface, a main housing peripheral wall interconnecting the first base surface and the second base surface, a battery charging circuit inside the internal compartment, an engagement portion integrally formed with the main housing and protruding from the first base surface of the main housing and extending in an axial direction away from the internal compartment to define an end surface on an axial free end of the engagement portion distal from the first base surface, an engagement portion peripheral wall interconnecting the first base surface and the end surface, a pair of battery charging terminals or one battery charging terminal protruding axially from the end surface, a pair of self-engaging latches which is under a resilient bias of an internal spring arrangement to protrude laterally outwards and away from the engagement portion peripheral wall, and a pair of press buttons on opposite lateral sides of the main housing peripheral wall operable to retract the latches inwardly towards the pair of battery charging terminals and inwardly away from the engagement portion peripheral wall; wherein the protruding engagement portion has a lateral profile which is shaped and dimensioned for insertion into a correspondingly shaped and dimensioned battery charger receptacle along the axial direction, and the self-engaging latches are shaped dimensioned and positioned to retract inwardly towards the battery charging terminal upon encountering the battery charger receptacle until reaching a latching portion on the battery charger receptacle whereat the self-engaging latches are to move laterally outwards due to the resilient bias to enter into releasable latched engagement with the latching portion, wherein the watch comprises a watch casing and a bottom cover for sealing a bottom side of the watch casing, wherein the watch casing defines a viewing window and has a component receptacle inside which watch components are received and a battery compartment inside which a rechargeable battery is installed, wherein the bottom cover defines a battery charger receptacle which is formed as an indentation on the bottom cover and which comprises a base surface and a peripheral surface surrounding the base surface to define the indentation, and the battery charger receptacle comprises a latching portion for the pair of latches of the battery charger to anchor on; wherein at least one contact terminal or a plurality of contact terminals is formed on the base surface of the battery charger receptacle for communication with a battery charging terminal of the battery charger and the battery charger receptacle is shaped and dimensioned to match the shape and dimensions of the engagement portion of the battery charger so that the engagement portion are received and latched inside the battery charger receptacle by cooperation between the pair of latches of the battery charger and the latching portion when the engagement portion is inserted axially into the battery charger receptacle with the battery charging terminal in contact abutment with the contact terminal on the base surface of the battery charger receptacle.

12. The apparatus according to claim 11, wherein the bottom cover is a steel plate and the base surface is formed on a sealed plastic plate which is fastened to the bottom cover in a water-tight manner, and the contact terminal is formed on and extends through the plastic plate; wherein the contact terminal is for data communication and/or for battery charging.

13. The apparatus according to claim 11, wherein the indentation of the battery charger receptacle has a depth of between 1.6 mm and 2.3 mm; and/or the indentation of the battery charger receptacle has a lateral extent of between 11 mm and 15 mm; and/or the base surface of the indentation of the battery charger receptacle has a surface area of between 0.35 cm$^2$ and 0.5 cm$^2$.

14. A power supply apparatus comprising a main housing, power supply circuitry housed inside an internal compartment of the main housing, a contact electrode or a plurality of contact electrodes connected to the power supply circuitry and protruding from the main housing, and an attachment means; wherein the main housing comprises a first surface, a second surface and a lateral surface which extends between the first surface and the second surface to surround the internal compartment; wherein a protrusion portion is formed on the second surface and protrudes in an axial direction away from the second surface, the protrusion portion comprising a forward surface and a peripheral surface surrounding the forward surface; wherein the peripheral surface extends around the forward surface and interconnects the second surface and the forward surface, and defines an axial extent of the protrusion portion; wherein the contact electrode protrudes from the forward surface of the protrusion portion and extends outside the main housing; wherein the contact electrode is resiliently retractable towards the main housing and is movable along the axial direction and comprises an exposed electrical contact surface at an axial free end which is distal from the main housing; wherein the attachment means is for making releasable latched engagement with a target device to facilitate power transfer such that when the power supply apparatus is attached to a target device with the attachment means in releasable latched engagement with the target device, the exposed electrical contact surface at the axial free end is at a retracted state and is in compressive electrical contact with a contact surface of a charging port of the target device.

15. The power supply apparatus according to claim 14, wherein the main housing comprises a first housing portion having the first surface and a second housing portion having the second surface which are joined together to define the internal compartment; wherein the second housing portion is molded of plastics and the protrusion portion is integrally formed on the second housing portion; and wherein the protrusion portions projects axially away from the second surface and the first surface and gradually tapers to narrow to form the forward surface and/or the protrusion portion is elongate, extends in a transversal direction which is orthogonal to the axial direction and defined between two parallel curves of substantially same curvature.

16. The power supply apparatus according to claim 14, wherein the protrusion portion gradually tapers to form a hollow integrally formed plastic shell on extending axially away from the first surface and the second surface.

17. The power supply apparatus according to claim 16, wherein the contact electrode or the plurality of contact electrodes protrudes through an axial end of the plastic shell and extends axially.

18. The power supply apparatus according to claim 16, wherein the attachment means comprises latching hooks which protrude through the peripheral surface of the protrusion portion and the latching hooks are movable in a lateral direction orthogonal to the axial direction between a latching state and a non-latching state.

19. The power supply apparatus according to claim 18, wherein the latching hooks are operable by a pair of push buttons, the push buttons being aligned along a transversal axis and are moveable towards each other along the transversal axis under resilient bias to move the latching hooks into the non-latching state.

20. The power supply apparatus according to claim 19, wherein the protrusion portion is non-symmetrical about the transversal axis.

\* \* \* \* \*